(12) United States Patent
Ouyang et al.

(10) Patent No.: US 9,064,147 B2
(45) Date of Patent: Jun. 23, 2015

(54) SKETCH RECOGNITION SYSTEM

(71) Applicant: Massachusetts Institute of Technology, Cambridge, MA (US)

(72) Inventors: Tom Yu Ouyang, Cambridge, MA (US); Randall Davis, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/219,176

(22) Filed: Mar. 19, 2014

(65) Prior Publication Data

US 2014/0205188 A1    Jul. 24, 2014

Related U.S. Application Data

(62) Division of application No. 13/310,182, filed on Dec. 2, 2011, now Pat. No. 8,718,375.

(60) Provisional application No. 61/459,065, filed on Dec. 3, 2010, provisional application No. 61/467,268, filed on Mar. 24, 2011.

(51) Int. Cl.
*G06K 9/42* (2006.01)
*G06K 9/00* (2006.01)

(52) U.S. Cl.
CPC ........ *G06K 9/00416* (2013.01); *G06K 9/00422* (2013.01); *G06K 9/00476* (2013.01)

(58) Field of Classification Search
CPC .......... G06K 9/00161; G06K 9/00402; G06K 9/00416; G06K 9/00422; G06K 9/2054; G06K 9/344; G06K 9/46; G06K 9/4614; G06K 9/726; G06K 2209/01; G06F 3/04883; G06F 17/211; G06F 17/242; G06F 17/30011; G06F 19/707; G06F 19/708; G06T 11/203; G06T 15/02; G06T 15/20; G06T 19/00; G06T 2200/08; Y10S 707/99936

See application file for complete search history.

(56) References Cited

U.S. PATENT DOCUMENTS 5,157,736 A    10/1992    Boyer et al.
5,832,474 A    11/1998    Lopresti et al.
(Continued)

OTHER PUBLICATIONS

Office Action, U.S. Appl. No. 13/310,182, dated Aug. 12, 2013.
(Continued)

*Primary Examiner* — Jose Couso
(74) *Attorney, Agent, or Firm* — Hamilton Brook Smith & Reynolds, PC

(57) ABSTRACT

Handwriting interpretation tools, such as optical character recognition (OCR), have improved over the years such that OCR is a common tool in business for interpreting typed text and sometimes handwritten text. OCR does not apply well to non-text-only diagrams, such as chemical structure diagrams. A method according to an embodiment of the present invention of interpreting a human-drawn sketch includes determining a local metric indicating whether a candidate symbol belongs to a certain classification based on a set of features. The set of features includes, as a feature, scores generated from feature images of the candidate symbol. Also included is determining a joint metric of multiple candidate symbols based on their respective classifications and interpreting the sketch as a function of the local and joint metrics. Sketches can be chemical composition, biological composition, electrical schematic, mechanical, or any other science- or engineering-based diagrams for which human-drawn symbols have well-known counterparts.

31 Claims, 11 Drawing Sheets

(56) References Cited

U.S. PATENT DOCUMENTS

| | | | |
|---|---|---|---|
| 6,233,351 | B1 | 5/2001 | Feeney et al. |
| 7,574,048 | B2 | 8/2009 | Shilman et al. |
| 7,639,250 | B2 | 12/2009 | Xu et al. |
| 7,729,538 | B2 | 6/2010 | Shilman et al. |
| 8,259,101 | B2 * | 9/2012 | Shimada et al. ............ 345/419 |
| 8,718,375 | B2 * | 5/2014 | Ouyang et al. ............. 382/187 |

OTHER PUBLICATIONS

Notice of Allowance, U.S. Appl. No. 13/310,182, dated Jan. 16, 2014.
Alvarado, C. and Davis, R. "SketchREAD: A Multi-Domain Sketch Recognition Engine", *Proceedings of the 17th annual ACM symposium on User Interface Software and Technology*, pp. 23-32 (2004).
Casey, R. et al., "Optical Recognition of Chemical Graphics", *Document Analysis and Recognition*, pp. 627-631 (1993).
Gennari, L.M., et al., "Combining Geometry and Domain Knowledge to Interpret Hand-Drawn Diagrams", *Computers & Graphics*, 29(4): 547-562 (2005).
Gross, M. "The Electronic Cocktail Napkin—A Computational Environment for Working with Design Diagrams", *Design Studies*, 17(1): 53-69 (1996).
Hammond, T. and Davis, R., "Ladder: A Language to Describe Drawing, Display, and Editing in Sketch Recognition", *International Conference on Computer Graphics and Interactive Techniques* (2006).
Kara, L.B. and Stahovich, T.F., "An Image-Based Trainable Symbol Recognizer for Sketch-Based Interfaces", *Association for the Advancement of Artificial Intelligence Fall Symposium: Making Pen-Based Interaction Intelligent and Natural* (2004).
Lafferty, J. et al., "Conditional Random Fields: Probabilistic Models for Segmenting and Labeling Sequence Data", *Proc. ICML*, pp. 282-289 (2001).
LaViola Jr., J.J. and Zeleznik, R.C., "Mathpad$^2$: A System for the Creation and Exploration of Mathematical Sketches", *ACM Transactions on Graphics*, 23(3):432-440 (2004).
Liu, D.C., and Nocedal, J., "On the Limited Memory BFGS Method for Large Scale Optimization", *Mathematical Programming*, 45(3): 503-528 (1989).
Murphy, K. et al., "Using the Forest to See the Trees: A Graphical Model Relating Features, Objects and Scenes", *Advances in Neural Information Processing Systems*, 16 (2003).
Murphy, K., et al., "Loopy Belief Propagation for Approximate Inference: An Empirical Study", *Proceedings of Uncertainty in AI (UAI)*, 9: 467-475 (1999).
Oltmans, M. "Envisioning Sketch Recognition: A Local Feature Based Approach to Recognizing Informal Sketches", Unpublished PhD thesis, Massachusetts Institute of Technology (2007).
Ouyang, T.Y. and Davis, R., "Learning from Neighboring Strokes: Combining Appearance and Context for Multi-Domain Sketch Recognition", *Advances in Neural Information Processing (NIPS)*, pp. 1401-1409 (2009).
Ouyang, T.Y. and Davis, R., "ChemInk: A Natural Real-Time Recognition System for Chemical Drawings", *Proceedings of the International Conference on Intelligent User Interfaces (IUI), Palo Alto, CA, USA* (Feb. 13-16, 2011).
Ouyang, T.Y. and Davis, R., "Recognition of Hand Drawn Chemical Diagrams", Proceedings of Association for the Advancement of Artificial Intelligence *(AAAI)*, (Feb. 13-16, 2007).
Ouyang, T.Y. and Davis, R., "A Visual Approach to Sketched Symbol Recognition" *proceedings of International Joint Conference on Artificial Intelligence (IJCAI)* (2009).
Paulson, B. and Hammond, T., "PaleoSketch: Accurate Primitive Sketch Recognition and Beautification", *Proceedings of Intelligent User Interfaces (IUI)*, pp. 1-10 (2008).
Sezgin, T. and Davis, R. "Sketch based interfaces: Early processing for sketch understanding", *International Conference on Computer Graphics and Interactive Techniques*, pp. 1-8 (2006).
Sezgin, T.M. and Davis, R., "Sketch recognition in interspersed drawings using time-based graphical models", *Computers & Graphics*, 32(5):500-510 (2008).
Sha, F. and Pereira, F., "Shallow Parsing with Conditional Random Fields", *Proceedings of HLT-NAACL*, pp. 134-141 (May-Jun. 2003).
Shilman, M., et al., "Statistical Visual Language Models for Ink Parsing", American *Association for Artificial Intelligence (AAAI) Spring Symposium on Sketch Understanding* (2002).
Shilman, M. et al., "Recognition and Grouping of Handwritten Text in Diagrams and Equations", *Frontiers in Handwriting Recognition* (2004).
Szummer, M., "Learning diagram parts with hidden random fields", *International Conference on Document Analysis and Recognition*, pp. 1188-1193 (2005).
Tenneson, D., "Interpretation of Molecule Conformations from Drawn Diagrams", Doctoral dissertation, Brown University (2008).
Xiong, Y. and LaViola Jr., J., "Revisiting Shortstraw: Improving Corner Finding in Sketch-Based Interfaces", *Proceedings of Eurographics Symposium on Sketch-Based Interfaces and Modeling*, pp. 101-108 (2009).

\* cited by examiner $f_1 = angle(v_i, v_j)$ $f_2 = angle(v_i, v_{ij})$ $f_3 = abs(|v_i| - |v_j|)$

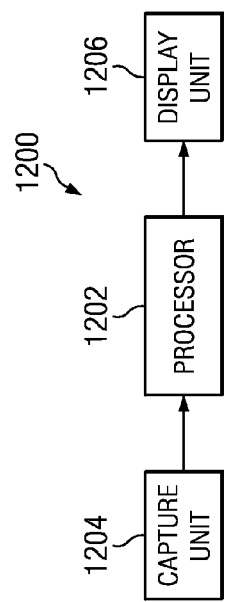
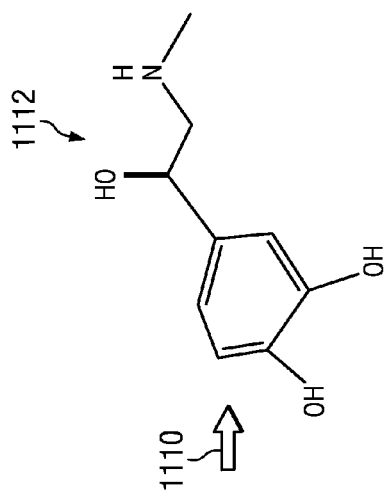
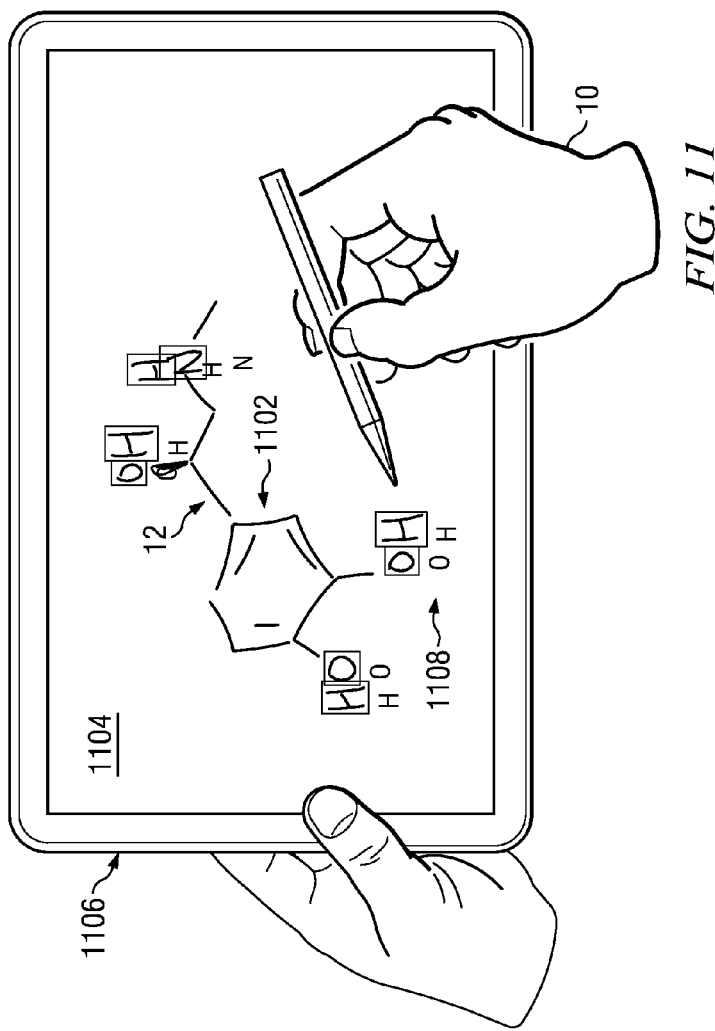
FIG. 11
FIG. 12

SKETCH RECOGNITION SYSTEM

RELATED APPLICATIONS

This application is a divisional of U.S. application Ser. No. 13/310,182, filed Dec. 2, 2011 which claims the benefit of U.S. Provisional Application No. 61/459,065, filed on Dec. 3, 2010 and U.S. Provisional Application No. 61/467,268, filed on Mar. 24, 2011.

The entire teachings of the above applications are incorporated herein by reference.

GOVERNMENT SUPPORT

This invention was made with government support under Grant No. CMMI-0729422 awarded by the National Science Foundation. The government has certain rights in the invention.

BACKGROUND

Sketches and diagrams are an essential means of communicating information and structure in many different domains, and can be important parts of the early design process, where they help people explore rough ideas and solutions in an informal environment. Despite the ubiquity of sketches, there is still a large gap between how people naturally interact with diagrams and how computers understand them today.

One field where sketches and diagrams are especially widely used is in chemistry, where the information encoded in a diagram provides essential information about a molecule's identity, chemical properties, and potential reactions. When chemists need to describe the structure of a compound to a colleague, they typically do so by drawing a diagram. When they need to convey the same structure to a computer, however, they must re-create the diagram using programs like CHEMDRAW that still rely on a traditional point-click-and-drag style of interaction. While such programs offer many useful features and are very popular with chemists, these CAD-based systems simply do not provide the ease of use or speed of simply drawing on paper.

Current work in sketch recognition can, very broadly speaking, be separated into two groups. The first group focuses on relationships between geometric primitives (e.g., lines, arcs, etc.), specifying them either manually (Hammond 2006, Gross 1996, Alvarado 2004) or learning them from labeled data (Szummer 2005, Sezgin 2008). Full citations for these and other references are provided below. Recognition is then posed as a constraint satisfaction problem, as in (Hammond 2006, Gross 1996), or as an inference problem on a graphical model, as in (Szummer 2005, Sezgin 2008, Alvarado 2004). However, in real-world sketches, it is difficult to extract these primitives reliably. Circles may not always be round or closed, line segments may not be straight, and stroke artifacts like pen-drag, over-tracing, and stray ink may introduce false primitives that lead to poor recognition. Furthermore, in many systems, the recognizer discards potentially useful information in the original strokes after it has extracted the primitives.

The second group of related work focuses on the visual appearance of shapes and symbols. These include parts-based methods (Oltmans 2007, Shilman et al., 2004), which learn a set of discrimitive parts or patches for each class, and template-based methods (Kara 2004, Ouyang and Davis 2009), which compare the input symbol to a library of labeled prototypes. The main advantage of vision-based approaches is their robustness to variations in drawing styles, including artifacts such as over-tracing (drawing over a previously drawn stroke) and pen drag (failing to lift the pen between strokes). However, these methods do not model the spatial relationships between neighboring shapes, relying on local appearance to classify a symbol.

There have also been previous efforts to recognize chemical diagrams. A sketch-based system that helps students visualize the three dimensional structure of an organic molecule is described in Tenneson (2007). Their system was able to avoid many of the challenges in sketched symbol detection by requiring that all symbols be drawn using a single stroke. Casey et al. (1993) developed a system for extracting chemical graphics from scanned documents, but their work focused on scanned printed chemical diagrams rather than freehand drawings. Ouyang and Davis (2007) presented a simpler chemistry sketch recognition system that was limited to symbols drawn using consecutive strokes.

SUMMARY

A method of interpreting a human-drawn sketch includes determining a local metric indicating whether a candidate symbol belongs to a certain classification based on a set of features, the set of features including, as a feature, scores generated from feature images of the candidate symbol. The method also includes determining a joint metric of multiple candidate symbols based on their respective classifications and interpreting the sketch as a function of the local and joint metrics.

The human-drawn sketch may include a plurality of strokes. The method may include generating each candidate symbol based on one or more of the strokes. Further, the method may include generating the feature images based upon stroke properties of the candidate symbols. Stroke properties can include orientations of the strokes and locations of stroke endpoints of the candidate symbols. The method may further include dividing the strokes in the human-drawn sketch into line segments at corner points using a trainable corner detector trained so that the line segments correspond to user-intended symbols. The candidate symbols may be generated by grouping together the strokes or line segments in the human-drawn sketch based on temporal and/or spatial relationships between the strokes or line segments.

In some embodiments, the set of features includes geometric features of candidate symbols based on the strokes or line segments. For example, the geometric features of candidate symbols can include, for each candidate symbol, any of a measure of the number of strokes in the candidate symbol, a measure of the number of segments in the candidate symbol, a measure of the diagonal length of a bounding box of the candidate symbol, and a measure of ink density. In an embodiment the measure of ink density includes the cumulative length of the strokes in the candidate symbol divided by the diagonal length of the candidate symbol.

In the method of interpreting a human-drawn sketch, the local metric can include a local likelihood and the joint metric can include a joint likelihood. Alternatively or in addition, the joint metric can include a joint metric of neighboring candidate symbols. In an embodiment, the joint metric of the multiple candidate symbols is determined based on their respective classifications and on their spatial and/or temporal relationships.

In some embodiments, the scores generated from the feature images include match scores, which may be determined by comparing the feature images against a set of stored templates. The method may include, before the comparing, performing any of smoothing, down sampling, stretching, and reducing the dimensionality of the feature images.

The method may further include using any of a graphical model, approximate inference, exact inference, and optimization techniques to produce the interpretation of the human-drawn sketch. Also included may be displaying the interpretation of the human-drawn sketch. Further, the method may include representing the candidate symbols with machine-generated symbols based upon the interpretation of the human-drawn sketch.

The human-drawn sketch can be selected from a group consisting of: a chemical composition diagram, a biological composition diagram, an electrical schematic diagram, a mechanical diagram, and any other science- or engineering-based diagram for which human-drawn symbols have well-known counterparts.

In some embodiments, the method includes capturing the human-drawn sketch, such as by capturing and recording spatial and temporal occurrences of strokes as the sketch is being drawn.

An apparatus for interpreting a human-drawn sketch includes a processor configured to determine a local metric indicating whether a candidate symbol belongs to a certain classification based on a set of features, the set of features including, as a feature, scores generated from feature images of the candidate symbol. The processor is also configured to determine a joint metric of multiple candidate symbols based on their respective classifications and interpret the sketch as a function of the local and joint metrics.

The processor may be configured to generate each candidate symbol based on one or more strokes of the sketch. The processor may be further configured to generate the feature images based upon stroke properties of the candidate symbols, which may include orientations of the strokes and locations of stroke endpoints of the candidate symbols. The processor may be further configured to divide the strokes in the human-drawn sketch into line segments at corner points using a trainable corner detector trained so that the line segments correspond to user-intended symbols. Further, the processor may be configured to generate the candidate symbols by grouping together the strokes or line segments in the human-drawn sketch based on temporal and/or spatial distances between the strokes or line segments.

In some embodiments, the scores include match scores and the processor is further configured to compare the feature images against a set of stored templates to determine the match scores. Further, the processor may be configured to perform any of smoothing, down sampling, stretching, and reducing the dimensionality of the feature images. In some embodiments, the processor is configured to produce the interpretation of the human-drawn sketch using any of a graphical model, approximate inference, exact inference, and optimization techniques.

The apparatus may include a capture unit coupled to the processor to capture the sketch as the sketch is being drawn. Also included may be a display unit coupled to the processor to display the interpretation of the human-drawn sketch.

The processor may further be configured to determined the joint metric of the multiple candidate symbols based on their respective classifications and on their spatial and/or temporal relationships.

An apparatus for interpreting a human-drawn sketch includes a first determination module configured to determine a local metric indicating whether a candidate symbol belongs to a certain classification based on a set of features, the set of features including, as a feature, scores generated from feature images of the candidate symbol. Also included are a second determination module coupled to the first determination module and configured to determine a joint metric of multiple candidate symbols based on their respective classifications, and an interpretation module coupled to the first and second determination modules and configured to interpret the sketch as a function of the local and joint metrics.

The apparatus may further include a generation module coupled to at least the first determination module and configured to generate each candidate symbol based on one or more strokes of the human-drawn sketch. The generation module can be configured to generate the feature images based upon stroke properties of the candidate symbols, such as orientations of the strokes and locations of stroke endpoints of the candidate symbols. The generation module can include a segmentation module configured to divide the strokes in the human-drawn sketch into line segments at corner points. The segmentation module can include a trainable corner detector configured to detect the corner points and trained so that the line segments correspond to user-intended symbols. The generation module may be further configured to generate the candidate symbols by grouping together the strokes or line segments in the human-drawn sketch based on temporal and/or spatial relationships between the strokes or line segments.

In some embodiments, the scores comprise match scores and the apparatus further includes a comparison module configured to compare the feature images against a set of stored templates to determine the match scores. The apparatus may further include a smoothing module coupled to the comparison module and configured to smooth the feature images, a downsampling module coupled to the comparison module and configured to down sample the feature images, a stretching module coupled to the comparison module and configured to stretch the feature images, and/or a dimensionality reduction module coupled to the comparison module and configured to reduce the dimensionality of the feature images.

In some embodiments, the interpretation module is further configured to interpret the human-drawn sketch using any of a graphical model, approximate inference, exact inference, and optimization techniques. The interpretation module can include a representation module configured to represent the candidate symbols with machine-generated symbols based upon the interpretation of the human-drawn sketch.

The apparatus can further include a capture module coupled to at least the first determination module and configured to capture the sketch as the sketch is being drawn, and/or a display module coupled to the interpretation module and configured to display the interpretation of the human-drawn sketch.

A computer program product includes a non-transitory computer readable medium having computer-executable instructions stored thereon, which, when loaded and executed by a processor, cause the processor to determine a local metric indicating whether a candidate symbol belongs to a certain classification based on a set of features, the set of features including, as a feature, scores generated from feature images of the candidate symbol; determine a joint metric of multiple candidate symbols based on their respective classifications; and interpret the sketch as a function of the local and joint metrics.

A method of detecting corners in a stroke of a hand-drawn sketch includes for each vertex in a set of vertices of a stroke, calculating a likelihood metric that the vertex is a corner; identifying a least likely vertex based on its likelihood metric; classifying the least likely vertex using segmentation parameters learned from training data; and determining whether the least likely vertex is classified as a corner. If the least likely vertex is classified as a corner, the method further includes returning all vertices remaining in the set of vertices as corners. If the least likely vertex is not classified as a corner, the method further includes removing the least likely vertex from the set of vertices and repeating the calculating, identifying, classifying, and determining.

The likelihood metric may include a measure of a cost of removing the vertex from the set of vertices. Classifying the least likely vertex may include applying the segmentation parameters learned from the training data to a set of features. The set of features can include, as a feature, the likelihood metric. Alternatively or in addition, the set of features can include any of a measure of a diagonal length, a measure of ink density, a measure of the distance to the farther of two neighboring vertices, a measure of the nearer of the two neighboring vertices, and a measure of the sum of the distances to the two neighboring vertices. In an embodiment, the method further includes splitting the stroke at the corners into line segments.

An apparatus for detecting corners in a stroke of a hand-drawn sketch includes a first determination module configured to calculate, for each vertex in a set of vertices of a stroke, a likelihood metric that the vertex is a corner; an identification module coupled to the first determination module and configured to identify a least likely vertex based on its likelihood metric; a classification module coupled to the identification module and configured to classify the least likely vertex using segmentation parameters learned from training data; a second determination module coupled to the classification module and configured to determine whether the least likely vertex is classified as a corner; an output module coupled to the second determination module and configured to, if the least likely vertex is classified as a corner, return all vertices remaining in the set of vertices as corners; and a removal module coupled to the second determination module and configured to, if the least likely vertex is not classified as a corner, remove the least likely vertex from the set of vertices and repeat the processing of the first determination module, the identification module, the classification module and the second determination module.

The classification module may be further configured to apply the segmentation parameters learned from the training data to a set of features. The output model may include a segmentation module configured to split the stroke at the corners into line segments.

A method of generating match scores includes comparing feature images of a candidate symbol against a set of stored templates, determining match distances of the feature images to nearest template neighbors based on the comparison, and converting the match distances into match scores.

The stored templates may be derived from training data and may include feature images of symbols identified in the training data. The match distances may be Euclidian distances. In an embodiment, the set of stored templates includes classes of templates. Determining match distances may include determining a match distance to a nearest template neighbor in each class of templates. Alternatively or in addition, determining match distances may include using principal component analysis to calculate principal components of the feature images, and the match distances may be determined based on the principal components of the feature images.

An apparatus for generating match scores includes a comparison module configured to compare feature images of a candidate symbol against a set of stored templates; a determination module coupled to the comparison module and configured to determine match distances of the feature images to nearest template neighbors based on the comparison; and a conversion module coupled to the determination module and configured to convert the match distances into match scores.

The set of stored templates may include classes of templates. The determination module may be further configured to determine a match distance to a nearest template neighbor in each class of templates. The determination module may be further configured to use principal component analysis to calculate principal components of the feature images, and wherein the match distances are determined based on the principal components of the feature images.

A method of interpreting a human-drawn chemical diagram includes determining a local metric indicating whether a candidate symbol belongs to a certain classification based on a set of features, the set of features including, as a feature, scores generated from feature images of the candidate symbol determining a joint metric of multiple candidate symbols based on their respective classifications; and interpreting the human-drawn chemical diagram as a function of the local and joint metrics.

Described herein is a new framework for automatic sketch recognition that has many advantages. Embodiments according to the present approach take as input a digital drawing of a diagram and output a recognized machine understandable structure that can then be used for other tasks (e.g., simulation, analysis, or search). One advantage of this technology over previous approaches is how it combines a rich representation of low level visual appearance with a probabilistic graphical model for capturing high level relationships. This dual approach allows sketch recognition apparatus and methods to be less sensitive to noise and drawing variations, improving robustness and accuracy. Unlike some previous methods that merely rely on local appearance to classify a symbol, the present approach takes advantage of the context around a symbol to facilitate the recognition task. The result is a framework that is better able to handle the range of drawing styles found in messy freehand sketches. It can also handle implicit structure such as omitted carbon and hydrogen atoms. This new recognizer has been successfully applied to two real-world domains, chemical diagrams and electrical circuits (Ouyang and Davis NIPS 2009, Ouyang and Davis 2011), and can be applied to many more.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 11 illustrates further details of the example apparatus and method of FIG. 1A.

FIG. 12 is a block diagram of an example apparatus for interpreting a human-drawn sketch in accordance with an embodiment of the invention.

DETAILED DESCRIPTION

A description of example embodiments of the invention follows.

Figure 1A:
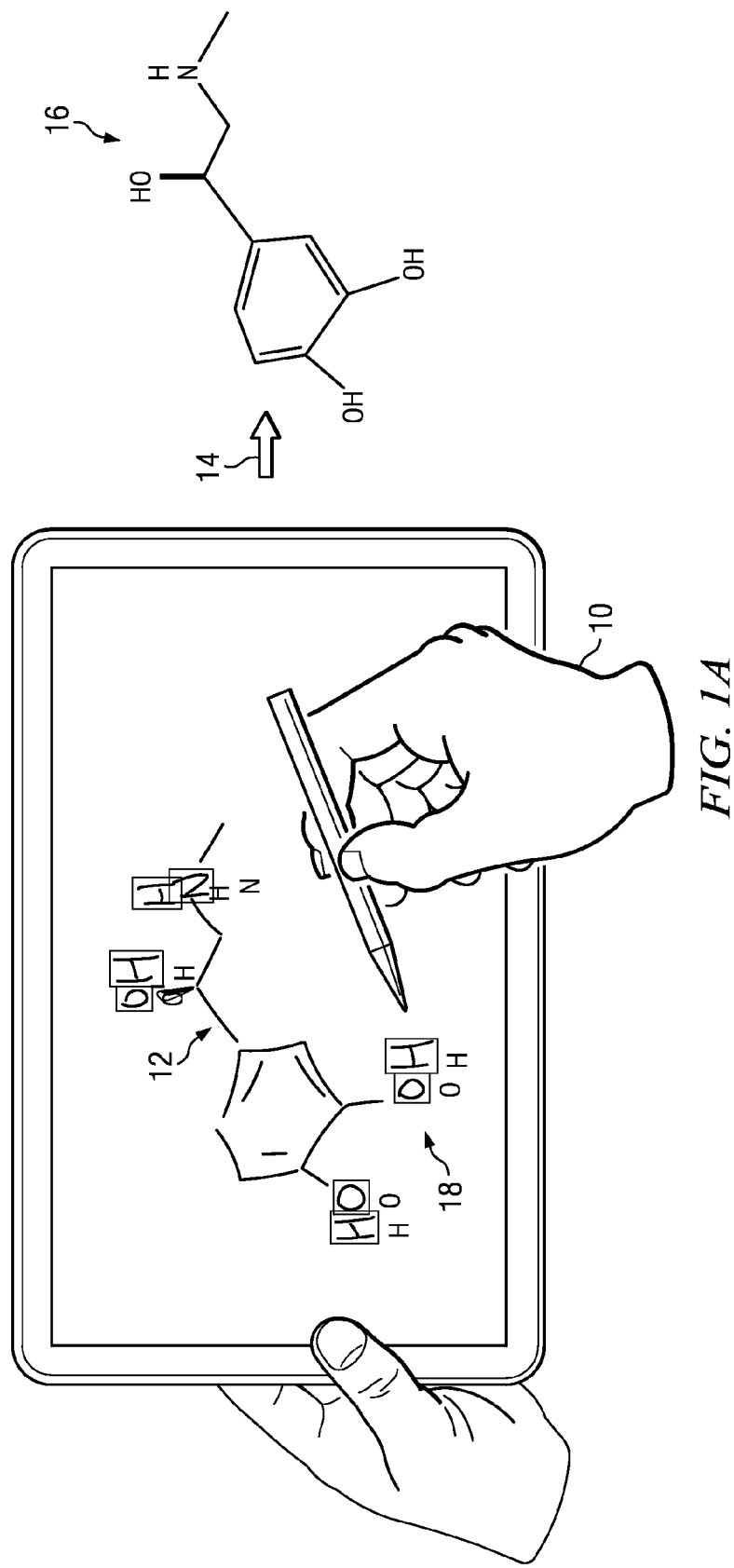
FIG. 1A illustrates an example apparatus and method for interpreting a human-drawn sketch in accordance with an embodiment of the present approach.

Described herein is a novel sketch-understanding architecture that provides a more natural way to specify diagrammatic information (such as chemical structures) to a computer. As illustrated in FIG. 1A, an embodiment of the present approach receives or captures from a user 10 a human-drawn sketch 12, which is then interpreted. To preserve the familiar experience of using pen and paper, example embodiments of the present invention support the same symbols, notations, and drawing styles with which people are already accustomed. Unlike physical pen and paper, however, sketches created and interpreted digitally can be readily exported 14 to other software programs, making possible tasks like simulation, visualization, and database lookup 16. Furthermore, since the user's input is interpreted in real-time, embodiments of this approach can provide feedback 18 as the sketch is being drawn as well as enable manipulation and correction. Further details are described below with reference to FIG. 11.

Embodiments of this new framework combine a rich representation of low-level visual appearance with a probabilistic model for capturing higher-level relationships. Here, "visual appearance" refers to a local image-based representation that preserves the pictorial nature of the ink. The term "higher level relationships" refers to the spatial relationships between different symbols. Embodiments of this approach are based on a graphical model that classifies each symbol jointly with its context, allowing neighboring interpretations to influence each other. Embodiments accomplish this by combining a hierarchy of visual features using a discriminatively trained conditional random field. A system according to this approach is less sensitive to noise and drawing variations, significantly improving robustness and accuracy. The result is a recognizer that is better able to handle the range of drawing styles found in messy freehand sketches.

Features of the present approach include: a symbol recognition architecture that combines vision-based features at multiple levels of detail; a discriminatively trained graphical model that unifies the predictions at each level and captures the relationships between symbols; a new approach to corner detection that learns a domain-specific model of how to segment strokes; a new clustering-based procedure for inferring the connectivity structure of sketched symbols; and a real-time sketch recognition interface that has been evaluated by intended end-users and compared against the most popular existing technique for chemical diagram authoring, demonstrating a two-fold speed advantage.

Although sketch recognition resembles object recognition in computer vision (Murphy 2003), there are at least two differences. First, a sketch is made up of temporally ordered strokes (i.e., sequences of points sampled between pen-down to pen-up) rather than pixel intensities. This means that embodiments of the present approach can take advantage of additional information about timing and stroke direction not readily available from an image. Second, objects in a sketched diagram are typically arranged in dense spatial configurations. This makes it even more useful to model the context around each symbol.

Figure 1B:
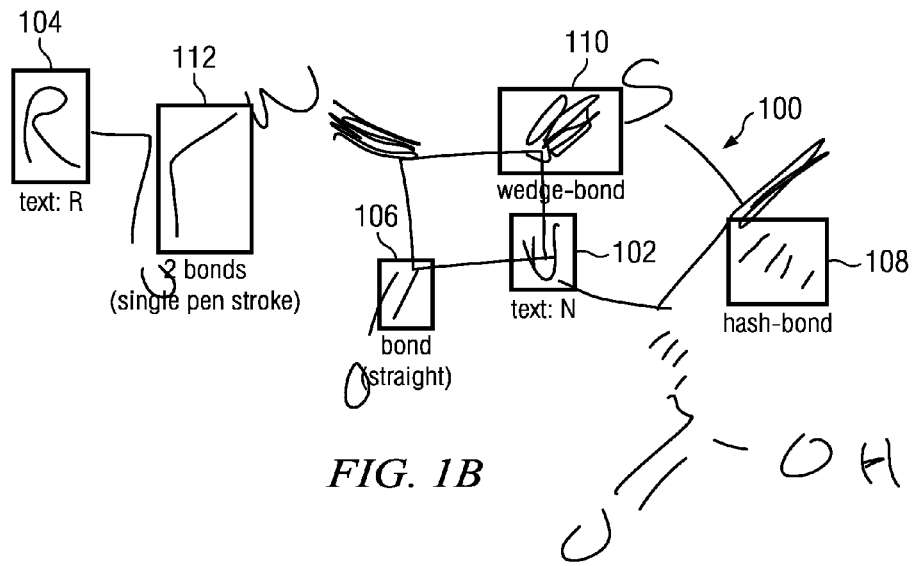
FIG. 1B illustrates an example of a chemical drawing that embodiments of the present approach are designed to recognize.

FIG. 1B illustrates an example of a chemical drawing 100 that embodiments of the present approach are designed to recognize. The notation includes element abbreviations 102 (e.g., "N", "O"), group abbreviations 104 (e.g., "R"), straight bonds 106 and 112, hash bonds 108, and wedge bonds 110. Wedge and hash bonds show the 3-D structure of a molecule: hash bonds angle down beneath the plane, wedge bonds angle up.

System Overview

Figure 2:
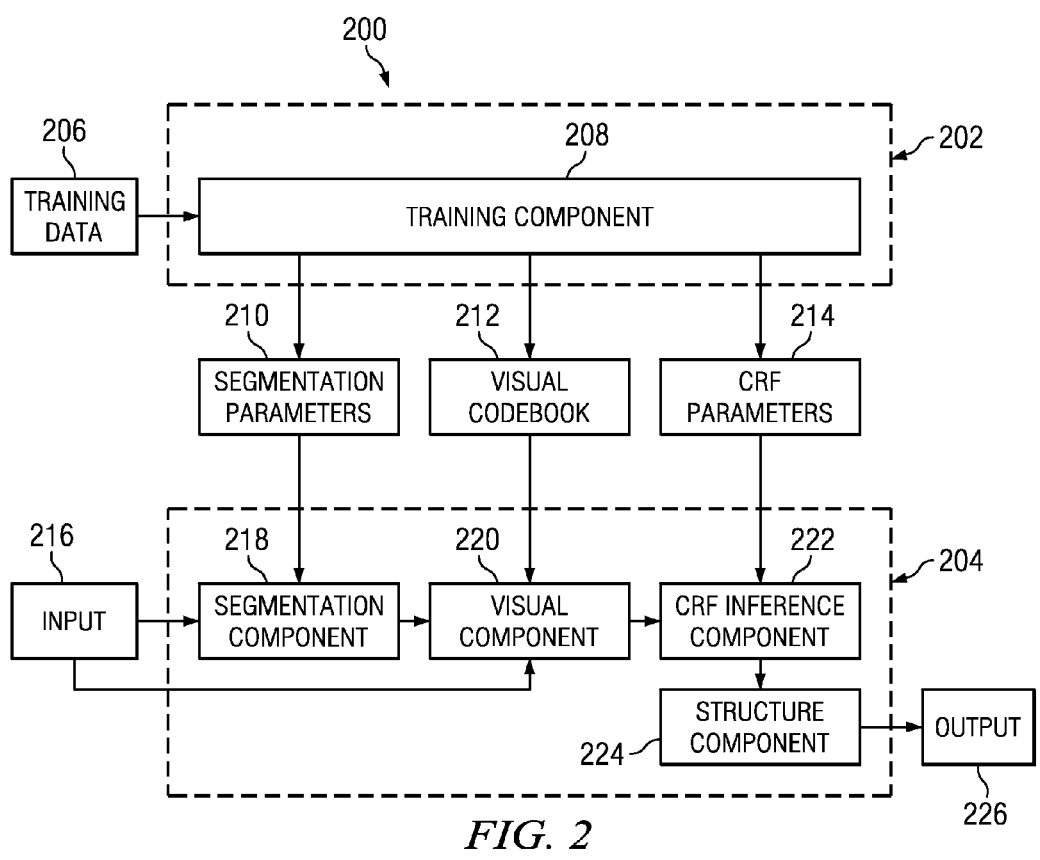
FIG. 2 illustrates the recognition process according to an embodiment of the present approach.

An overview of an example system for interpreting a human-drawn sketch according to the present approach is shown in FIG. 2. System 200 can be divided into two stages, a training stage 202 and a recognition stage 204. The training stage 202 includes the training component 208 that uses training data 206 to learn a segmentation model (segmentation parameters) 210, a visual codebook 212, and CRF parameters 214. The recognition component 204 takes as an input 216 a sketch (a set of input strokes) and identifies all symbols in the sketch (e.g., elements and bonds). Recognition component 204 then interprets the connectivity of these symbols to form a complete molecular structure, which is provided as output 226 for display, export, or further processing. In the training stage, the system learns a statistical model for sketch recognition based labeled training data. This includes learning how to 1) break complete strokes into smaller stroke segments, 2) identify potential symbols from the sketch based on visual appearance, and 3) use the relationships between neighboring segments and symbols to form a complete interpretation for the sketch. In the recognition stage, the system uses this learned model to interpret a new sketch. The recognition stage 204 includes segmentation component 218, visual component 220, CRF inference component 222, and structure component 224.

Segment Extraction

Figure 3A:
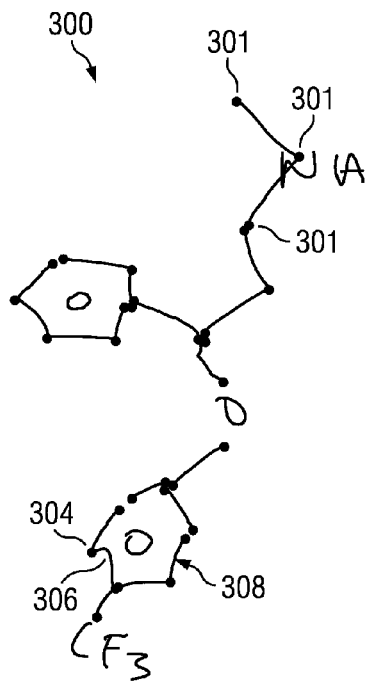
FIGS. 3A-B illustrate results of segment extraction on two chemical drawings. Detected corners are shown as dots. Note that only corners from strokes that represent straight bonds are shown.
Figure 3B:
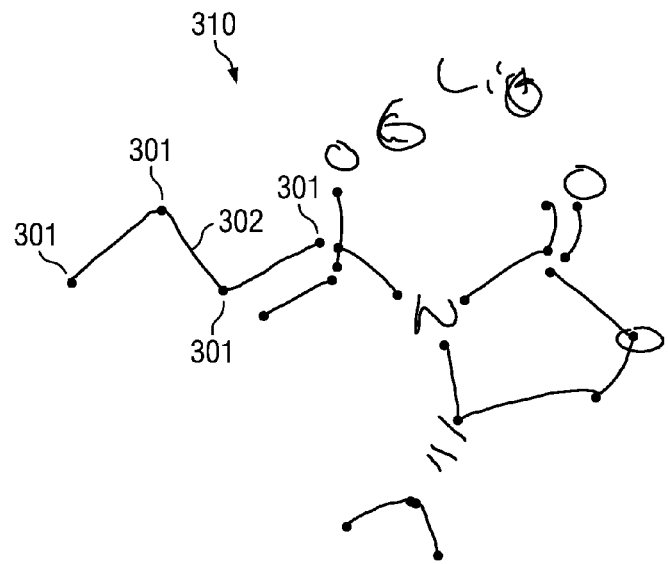

The first level of the hierarchy is composed of stroke segments extracted from the sketch. These segments are generated by dividing strokes at corner points, as illustrated in FIGS. 3A-B for two example sketches 300 and 310. Detected corners 301 are shown as dots superimposed on chemical diagram sketches 300 and 310. In the chemical domain, corners have a special meaning because they determine the breaks between straight bonds. This is because chemists often draw multiple straight bonds using a single polyline stroke, as shown at 302 (see also 112 in FIG. 1B), relying on the reader to infer that they are actually drawing multiple individual bonds connected by implicit Carbons. Carbons and Hydrogen atoms are so common in chemistry that they are typically left out of the drawing, and are assumed to be present anywhere that two bonds connect without an intermediate atom.

Prior work on corner detection has focused primarily on finding well-defined corners in isolated shapes, where there is a clear distinction between corners, curves, and lines. As seen in FIGS. 3A-B, however, corners in real-world chemical drawings are often messy and unclear. To deal with these challenges, embodiments of the present approach include a novel corner detector that learns how to segment a stroke. Instead of forcing the developer to define thresholds and parameters beforehand, the corner detector is trained from labeled sketch data. This allows the detector to learn a specific model of what it means to be for example, a corner in chemical diagrams, which may be different from what it means to be a corner in another domain.

Figure 4:
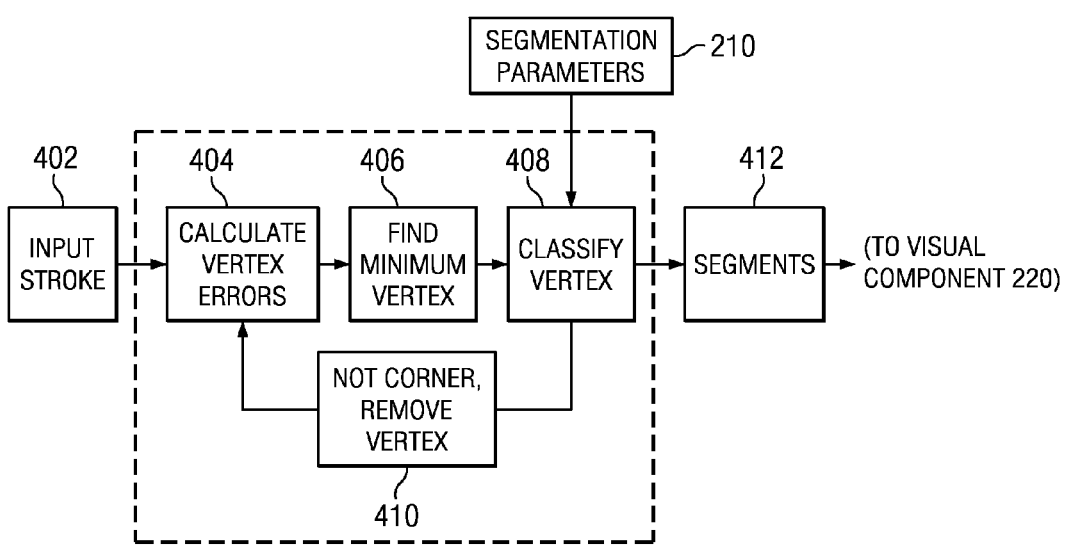
FIG. 4 illustrates an example segmentation component.

An illustration of a corner detector is shown in FIG. 4. For each input stroke 402, an error value is calculated 404 for each vertex that is a rough measure of how likely it is that the vertex is a corner. The vertex that is least likely a corner based on its error is found 406 and classified 408 using the segmentation parameters 210 learned from training data. If the vertex is classified as a corner, all remaining vertices are assumed to be corners and the segmentation is completed 402. If it is not classified as a corner, it is removed 410 and the process repeated. Instead of immediately trying to decide which points are corners, the corner detector repeatedly removes the point that is least likely to be a corner. This process stops when the detector decides that all of the remaining points are likely to be corners. Specifically, the process repeatedly discards the point $p_i$ that introduces the smallest cost when removed:

$$\mathrm{cost}(p_i) = \sqrt{\mathrm{mse}(s_i; p_{i-1}, p_{i+1})} \cdot \mathrm{dist}(p_i; p_{i-1}, p_{i+1})$$

where $s_i$ is the subset of points in the original stroke between point and point $p_{i+1}$ and $\mathrm{mse}(s_i; p_{i-1}, p_{i+1})$ is the mean squared error between the set $s_i$ and the line segment formed by $(p_{i-1}, p_{i+1})$. The term $\mathrm{dist}(p_i; p_{i-1}, p_{i+1})$ is the minimum distance between $p_i$ and the line segment formed by $(p_{i-1}, p_{i+1})$.

Instead of using a hard threshold to determine when to stop removing vertices, the corner detector learns the likelihood of a vertex being a corner from training data. For each vertex elimination candidate $p_m$ (the point with the lowest cost), the detector extracts the set of features shown in Table 1. During classification, if the classifier decides that $P_m$ is not a corner, it removes the vertex and continues to the next elimination candidate. If, on the other hand, it decides that the vertex is a corner, the process stops and all remaining vertices are returned as corners.

TABLE 1

List of features for corner detection.

| Feature | Description |
| --- | --- |
| Cost | The cost of removing the vertex, from Equation 1. |
| Diagonal | The diagonal length of the stroke's bounding box. |
| Ink Density | The length of the stroke divided by the diagonal length. |
| Max Distance | The distance to the farther of its two neighbor ($p_{i-1}$ or $p_{i+1}$) normalized by the distance between the two neighbors. |
| Min Distance | The distance to the nearer of its two neighbor normalized by the distance between the two. |
| Sum Distance | The sum of the distances to the two neighbors normalized by the distance between the two. |

One useful feature of this approach is that in each iteration the process makes its decision based on the set of corner candidates that are still remaining, taking advantage of the partial solution generated so far. To illustrate this, consider the bottom ring 308 in diagram 300 of FIG. 3A, where there are two high-curvature points close to each other and only one of them, 304, is an intended corner (the other, 306, has high curvature due to noise, a common problem in corner detection since noise is easily mistaken for a corner). When both high-curvature points still remain in the polyline approximation, removing either one of them will not change the local shape by very much (i.e., have low cost). However, after one of them is removed, the cost of removing the remaining point becomes much larger. This leads to the correct behavior of eliminating only one of the points. Of course, other features from Table 1 will factor into the decision, so this is an illustrative but much simplified description.

After segment extraction, the system records the length of the longest segment L (excluding the top 5% as outliers). This value is later used as an estimate for the scale of the sketch.

Segment Features

In order to make predictions about each segment, the surrounding patch of ink is modeled using a set of rich local descriptors similar to those used in (Ouyang and Davis 2009). These descriptors focus on visual appearance rather than temporal or geometric patterns, making them less sensitive to stroke level differences like pen-drag (not lifting the pen between typically separate strokes) and over-tracing (drawing over a previously drawn region or shading). This improves robustness and accuracy.

An embodiment of the present approach uses four sets of feature images to describe the local appearance around each segment, at varying scales and orientations. The individual feature images in each set act as orientation filters, capturing only the ink that was drawn at a specified pen direction (at 0, 45, 90, and 135 degrees). For example, in the 0-degree feature image, a bright pixel indicates that the pen direction at that point is perfectly horizontal; a dim pixel indicates that the direction is somewhat horizontal; and a black pixel means that there is no ink at that point or that the pen direction is diagonal or vertical.

These descriptors can be made invariant to scale by normalizing the size of the ink patch based on L and 2L. Also, half of the images can be made invariant to rotation by reorienting them so that the direction of segment is horizontal. This dual representation helps the system model both variable-orientation symbols like bonds as well as fixed-orientation symbols like elements and group abbreviations.

The set of visual ink features can be rendered onto four 10×10 pixel feature images. One can perform Gaussian smoothing on each image to improve robustness and reduce sensitivity to small distortions and noise. Each image can be downsampled by a factor of 2 to a final size of 5×5 pixels to improve computation speed. The result is a set of sixteen 5×5 pixel images, producing a total of 400 feature values per segment.

In addition to these feature images, embodiments may also use the set of geometric properties listed in Table 2 to further describe each segment.

TABLE 2

List of geometric features for segment classification.

| Feature | Description |
| --- | --- |
| Length | The length of the segment. |
| Ink Density | The length of the stroke region matching the segment divided by the length of the segment. |
| Segment Count | The total number of segments in the parent stroke (discrete, ceiling = 10). |
| Stroke Diagonal* | The diagonal length of the parent stroke's bounding box. |
| Stroke Ink Density | The length of the parent stroke divided by the diagonal length of the parent stroke's bounding box. |

Note: (*) next to a feature in Tables 2 and 3 indicates that two version of this feature may be included, one normalized by L and the other un-normalized.

Candidate Symbols

Symbols are the second unit of classification in the hierarchy. A symbol may be defined as a group of one or more segments that represents a complete entity in the domain (e.g., bonds, elements, etc.). In an embodiment, a procedure searches for candidate symbols (henceforth referred to as candidates) among groups of temporally or spatially contiguous strokes. The procedure forms the set of temporal candidates by considering, for example, all possible sequences of up to n=8 consecutively drawn strokes. In an embodiment, the procedure forms the set of spatial candidates by combining groups of strokes that are close to each other. This process starts with all possible groups of size 2 (each stroke and its nearest neighbor) and successively expands each group by including the next nearest stroke (e.g., each stroke and its 2 nearest neighbors, then its 3 nearest neighbors, etc.). This expansion ends when either the size of the group exceeds a spatial constraint or when the group contains more than 4 strokes. This spatial grouping procedure allows temporal gaps in candidates, so symbols need not be drawn with consecutive strokes.

Figure 5:
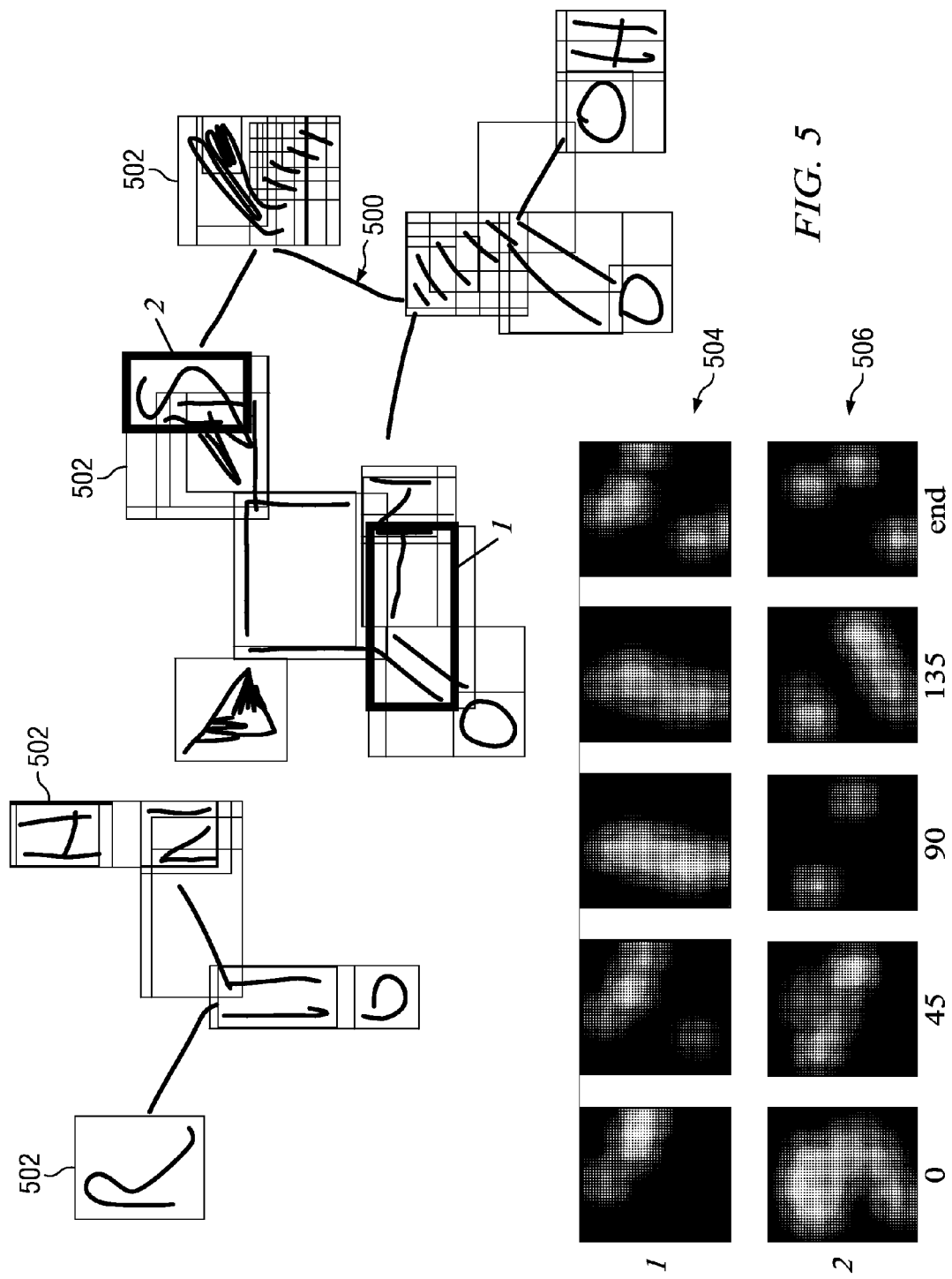
FIG. 5 illustrates example symbol candidates. Shown is a set of candidates extracted from a chemical diagram and the feature images generated for two example candidates.

FIG. 5 shows an example of a hand-drawn sketch 500, symbol candidates 502, and generated feature images 504 and 506 for two example candidates 1 and 2. Notice that feature images 506 for the "S" (candidate 2) are stretched horizontally to ensure equal standard deviation of ink in both axes. For each symbol, an embodiment of the present approach may generate a set of five 20×20 feature images, four orientation filter images (at 0, 45, 90, and 135 degrees) and one "endpoint" image (labeled "end") that captures the location of stroke endpoints. These feature images contain only the strokes that belong to the candidate (unlike feature images in the other levels, which include all the ink in a local patch). In order to improve robustness to differences in aspect ratio, each candidate symbol may be stretched so that it has the same standard deviation of ink in both the x and y axes. As before, each image can be smoothed and downsampled by a factor of 2.

In addition to these five feature images, embodiments according to the present approach include another set of four images that describe the ink in a patch around the candidate. These are identical to those used for segments, but are centered at the center of the candidate with a region size of L. The result is a total of 600 feature image values. Embodiments may also include as features the set of geometric properties listed in Table 3.

TABLE 3

List of features for symbol candidate classification.

| Feature | Description |
| --- | --- |
| Stroke Count | The number of strokes in the candidate (discrete, ceiling = 10). |
| Segment Count | The number of segments in the candidate (discrete, ceiling = 10). |
| Diagonal* | The diagonal length of the candidate's bounding box. |
| Ink Density | The cumulative length of the strokes in the candidate divided by the diagonal length of the candidate. |

Feature Image Templates

Figure 6:
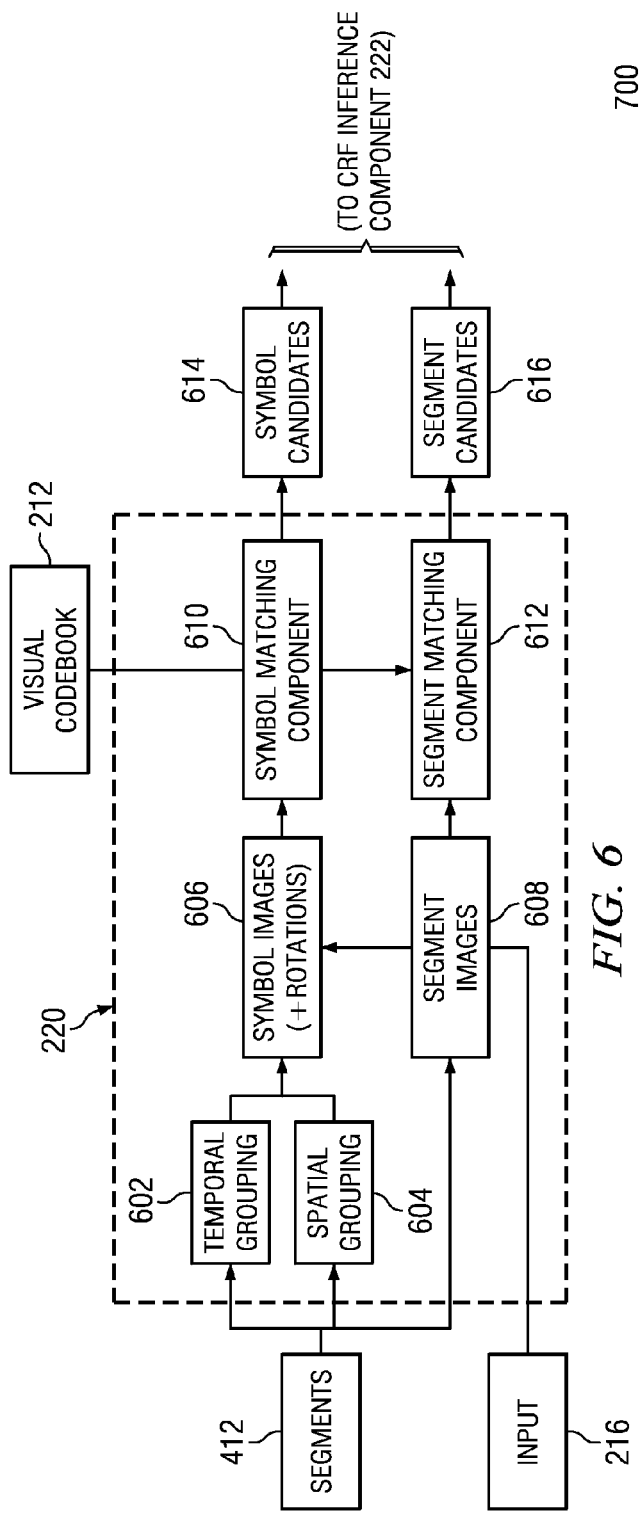
FIG. 6 illustrates an example visual component, which generates symbols by grouping together segments that are temporally or spatially connected.

FIG. 6 illustrates an example visual component 220, which generates symbols by grouping together segments 416 that are temporally connected (temporal grouping 602) or spatially connected (spatial grouping 604). Visual component 220 takes segments 412 and input 216, e.g., a human-drawn sketch, and generates symbol candidates 614 and segment candidates 616. As described above, the present approach generates sets of feature images (symbol images 606 and segment images 608) for each classification entity (e.g., candidate symbols and segments); however, embodiments of the present approach need not use the image values directly as features for classification. Instead, the images can be compared against a set of stored templates taken from the training data (e.g., visual codebook) 212, and the match distances to the nearest template neighbor in each class are recorded. To compare respective symbol and segment features images, visual component 220 includes symbol matching component 610 and segment matching component 612. In order to make matches at the candidate level rotation invariant, 8 evenly-spaced rotations of the candidate symbol (see 606) may be tested. Next, the present approach can convert these distances into match scores (score=1.0—distance) and use as features both the label of the nearest neighbor and the best match scores to each class. For example, a candidate whose nearest neighbor is an "N" (Nitrogen) symbol might have the following features: (nearest="N", score.N=0.7, score.H=0.5, etc.).

To improve the speed and memory usage of the template matching process described above, principal component analysis or sub-sampling can be used to reduce the dimensionality of the feature images. For example, an embodiment of visual component 220 may compress the 400 image values from a segment to 256 principal components. Visual component 220 can then calculate match distances based on these principal components rather than the original image values.

Sketch Recognition Using Graphical Models

Embodiments use a new model for sketch recognition based on conditional random fields (CRFs) that combines the features from the two levels in the classification hierarchy. A CRF can be seen as a probabilistic framework for capturing the statistical dependencies between the different entities we wish to model (i.e., segments and candidates).

Figure 7:
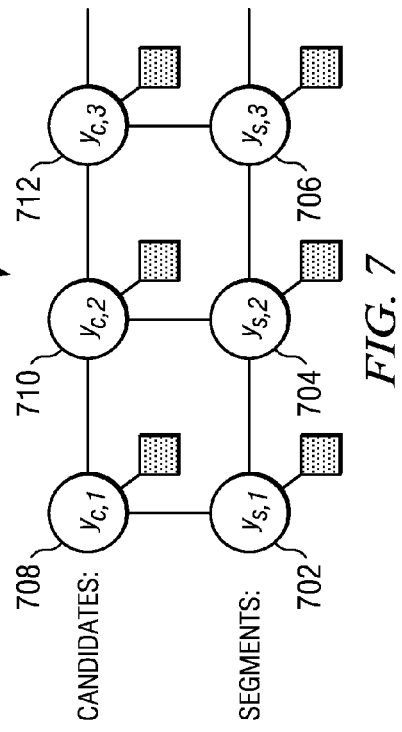
FIG. 7 illustrates a conditional random field (CRF) graph. The graphical model captures the contextual relationships between the different candidates so that the classification for a given candidate depends on the classification of its neighbors.

FIG. 7 shows an illustration of a CRF graph structure 700. Circles represent label nodes (y), edges represent relationships, and dark boxes represent evidence nodes (x) that connect the label nodes to their corresponding features. The nodes 702, 704, 706 in the bottom row represent labels for segments ($y_s$). Segments have a fixed set of possible labels including: "bond" (straight bond), "hash", "wedge", and "text." The "text" label temporarily condenses the specific letters and abbreviations (e.g., "H", "O", "R", "Ac") into a single label. When classification is finished, any candidate symbol recognized as "text" is converted back to the letter identity of its nearest template match.

The nodes 708, 710, 712 at the top level represent symbol candidates ($y_c$). Notice that the model creates one candidate node for each segment rather than one for each candidate. This node contains, as possible labels, all of the candidates that the segment could belong to. During the inference process the system chooses the best candidate for each segment and adds the candidate to the set of final symbol detections. For example, if the system decides that the correct label for $y_{c,2}$ (the candidate node for segment 2) is a "wedge" candidate containing segments [1,2,4], then the "wedge" candidate is added to the final symbol detections. Note that the candidate node labels can contain multiple interpretations of each candidate, so $y_{c,2}$ also has "hash" and "text" versions of candidate [1,2,4] as possible labels (the "bond" label is only applied to single-segment candidates).

The edges in the CRF model encode four types of relationships between nodes:

Entity Features to Label Mapping: One can define φ as the local potential function that determines the compatibility between an entity's features and its label. This is analogous to a local classifier that classifies each entity independently of the others.

$$\phi_s(y_{s,i}, x_{s,i}; \theta) = \sum_K f_{s,k}(y_{s,i}, x_{s,i})\theta_{s,k}$$

Here $x_{s,i}$ is the set of features for segment i, $y_{s,i}$ is a label for the segment, and $f_{s,k}$ is a feature function defining the set of features for a segment. Note that is linear to the parameters θ, making the joint model (joint probability described below) log-linear. For the candidate symbol nodes we have an analogous version of this local potential function.

$$\phi_c(y_{c,i}, x_{c,i}; \theta) = \sum_K f_{c,k}(y_{c,i}, x_{c,i})\theta_{c,k}$$

Cross-Level Label Consistency: This is a pairwise constraint stating that predictions at each level need to be consistent with predictions at other levels. For example, a segment and its parent candidate should have the same label.

$$\varphi_s(y_{s,i}, y_{c,i}) = \begin{cases} 0, & \text{if } y_{s,i} = y_{c,i} \\ -inf, & \text{otherwise} \end{cases}$$

Segment to Segment Spatial Context: This pairwise relationship captures the spatial compatibility between pairs of segments given their respective labels. This relationship enables a system according to the present approach to classify each segment jointly with its context, allowing neighboring interpretations to influence each other.

$$\varphi_s(y_{s,i}, y_{s,j}, x_{s,i}, x_{s,j}; \theta) = \sum_K f_{ss,k}(y_{s,i}, y_{s,j}, x_{s,i}, x_{s,j})\theta_{ss,k}$$

Figure 9A:
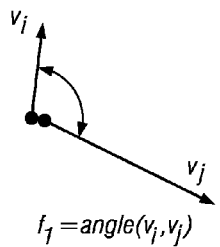
FIGS. 9A-C illustrate three pairwise relationships used in the spatial context compatibility between segments.
Figure 9B:
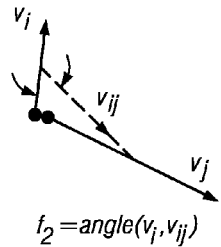
Figure 9C:
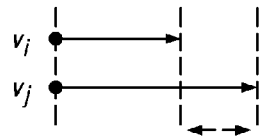

Here the feature function $f_{ss,k}$ contains the 3 spatial relationships shown in FIGS. 9A-C. In the figure, $v_i$ and $v_j$ are vectors representing segments $x_i$ and $x_j$, and $v_{ij}$ is a vector from the center of $v_i$ to the center of $v_j$. The system discretizes $f_1$ and $f_2$ into bins of size π/8 and $f_3$ into bins of size L/4.

Candidate to Candidate Spatial Context: This is a similar relationship that captures the spatial compatibility between pairs of symbol candidates given their respective labels. This relationship enables a system according to the present approach to classify each symbol jointly with the symbols around it, further allowing neighboring interpretations to influence each other.

$$\bar{\varphi}_c(y_{c,i}, y_{c,j}, x_{c,i}, x_{c,j}; \theta) = \sum_K f_{cc,k}(y_{c,i}, y_{c,j}, x_{c,i}, x_{c,j})\theta$$

Note that this constraint also prevents the system from choosing two different candidates that overlap each other (i.e., share any of the same segments), resulting in conflicting interpretations for those segments.

$$\varphi_c(y_{c,i}, y_{c,j}, x_{c,i}, x_{c,j}; \theta) = \begin{cases} \bar{\varphi}_c, & \text{if } y_{c,i} = y_{c,j} \text{ or } y_{c,i} \text{ does not overlap } y_{c,j} \\ -inf, & \text{otherwise} \end{cases}$$

Combining all of the relationships described above, the joint probability function over the entire graph is:

$$\log P(y \mid x, \theta) = \\ \sum_{i \in V_s} \phi_s(y_{s,i}, x_{s,i}; \theta) + \sum_{i \in V_c} \phi_c(y_{c,i}, x_{c,i}; \theta) + \sum_{i,j \in E_{sc}} \varphi_s(y_{s,i}, y_{c,j}) + \\ \sum_{i,j \in E_{ss}} \varphi_s(y_{s,i}, y_{s,j}, x_{s,i}, x_{s,j}; \theta) + \sum_{i,j \in E_{cc}} \varphi_c(y_{c,i}, y_{c,j}, x_{c,i}, x_{c,j}; \theta) - \log Z$$

where $E_{sc}$ is the set of label consistency edges from segments to symbols, $E_{cc}$ is the set of spatial context edges from candidates to candidates, and $E_{ss}$ is the set of spatial context edges from segments to segments. Z is a normalization constant.

Figure 8:
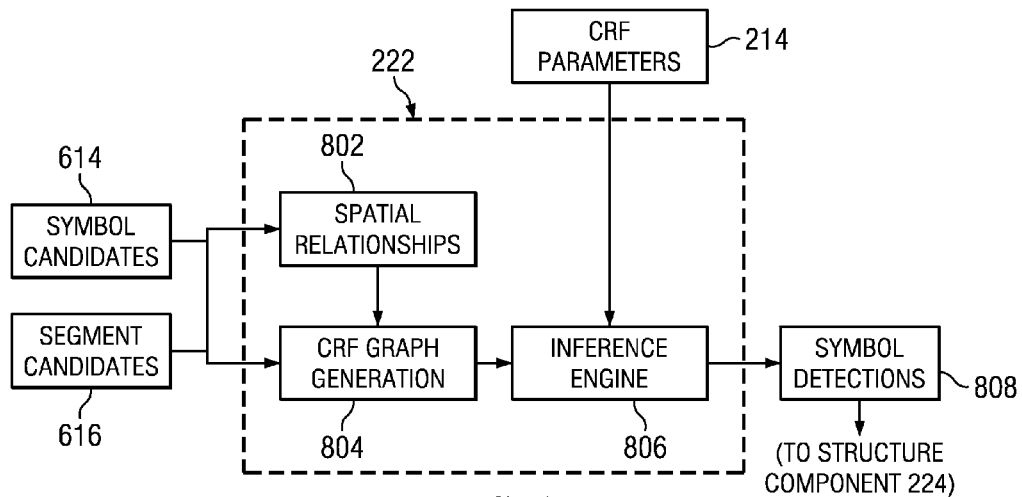
FIG. 8 illustrates an example CRF inference component. The CRF inference component takes all of the candidates from the two levels (segments and symbols) and decides which candidates are actual symbols and which are misgroupings using a probabilistic graphical model (a conditional random field, CRF) to encode the relationships between the candidates.

FIG. 8 illustrates an example CRF inference component 222. The CRF inference component 222 takes all of the candidates from the two levels (segment candidates 616 and symbol candidates 614) and decides which candidates are actual symbols and which are mis-groupings using a probabilistic graphical model (a conditional random field, CRF) to encode the relationships between the candidates. The inference and parameter estimation process is illustrated in FIG. 8 and further described below. As shown, CRF inference component 222 includes CRF graph generation module 804 and inference engine 806. The CRF graph generation module receives symbol and segment candidates 614 and 616 as well as their spatial relationships 804, and generates a CRF graph.

The inference engine 806 uses the CRF graph and CRF parameters 214, which are learned from training data, to produce symbol detections 808.

Inference and Parameter Estimation

During training the system estimates the parameters θ in a maximum likelihood framework. The goal is to find θ*=argmax L(θ), where, following the previous literature on CRFs (Lafferty 2001), L(θ) is defined:

$$L(\theta) = \log P(y \mid x, \theta) - \frac{1}{2\sigma}\|\theta\|^2$$

Here the second term is a regularization constraint on the norm of θ to help avoid overfitting. L(θ) can be optimized with a gradient ascent procedure, calculating the gradient for each parameter $$\frac{\delta}{\delta \sigma_i} L(\theta).$$

This process requires computation of the marginals $P(y_i|x, \theta)$. Since loops in the graph make exact inference intractable, one can calculate these marginals using loopy belief propagation (Murphy 1999), an approximate inference procedure. For example, inference engine 806 of CRF inference component 222 may employ a randomized message passing schedule and run the belief propagation procedure for up to 100 iterations. For gradient ascent one can use L-BFGS (Liu and Nocedal 1989), a quasi-Newton nonlinear optimization method that has been applied successfully to other CRF-based problems in the past. One can use the same belief propagation procedure during inference.

Real-Time Recognition

According to the present approach, an example system takes about 1 second to classify a sketch on a 3.7 ghz processor running in a single thread. While this is likely sufficient for real time recognition, one can take steps to make sure that the system is fast enough to run on slower Tablet PCs. First, one can implement an incremental recognition model that updates the interpretation only of strokes and segments that have been modified or added since the last pass. Second, one can make the most time consuming step of the process, generating features and template matches, parallel so that the system take advantage of multi-core CPU. In an on-line user study, a 1.8 ghz Tablet PC was able to easily keep up with the users' drawings.

Structure Generation

Figure 10A:
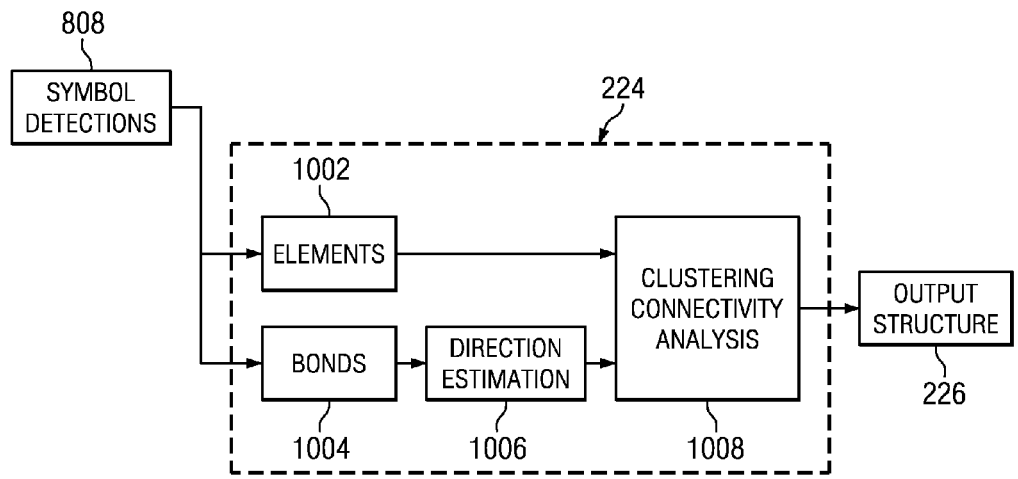
FIG. 10A illustrates an example structure component.
Figure 10B:
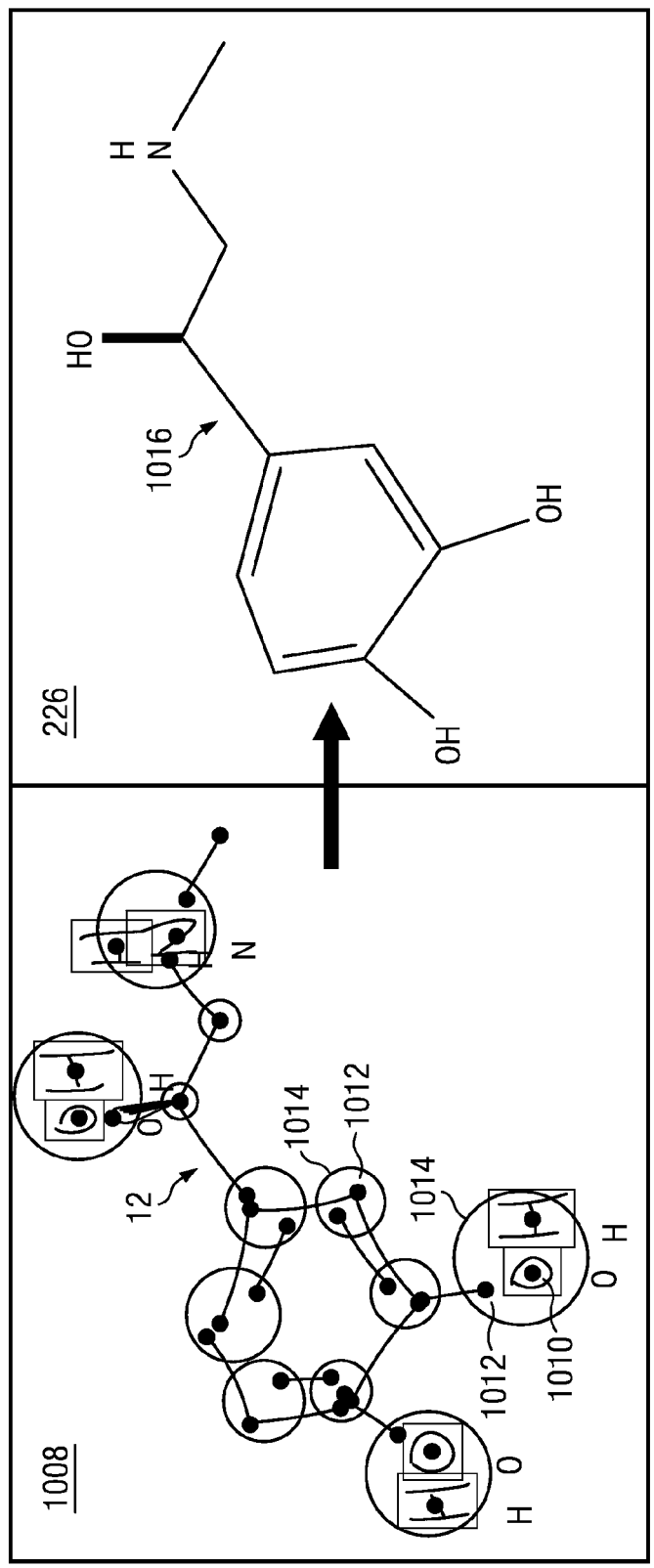
FIG. 10B illustrates a structure generation process according to an embodiment of the present approach.

FIG. 10A illustrates an example structure generation component. After choosing the final set of symbol detections 808, the structure component 224 builds a connectivity graph between the symbols to produce the complete molecular structure as output structure 226. An example of this connectivity process is illustrated in FIG. 10B. In this figure, the dots located on letter symbols 1010 and bond endpoints 1012 of sketch 12 represent connection points. The larger circles 1014 represent the inferred connections generated by an embodiment of the system. The connectivity process then performs a clustering-based analysis 1008 to determine how these points are connected to each other. This symbol connectivity analysis is based on three pairwise distance metrics:

Bond-element distance: The distance between a bond and an element is the distance from the bond endpoint to the nearest point in the element symbol. Embodiments impose an additional penalty if the bond does not point towards the element. For hash and wedge bonds, the direction of the bond can be defined as the principal axis based on PCA.

Element-element distance: The distance between two letter symbols is defined as the distance between the two at their closest point.

Bond-bond distance: The distance between two bonds is defined as the distance between their respective endpoints. Embodiments impose a penalty if the bonds do not point towards each other (e.g., if one bond is pointed to the midpoint of the other) or if they are nearly parallel (though parallel double bonds are technically connected to each other, the present approach is particularly interested in determining the elements to be joined at either of their endpoints).

As shown in FIG. 10A, the structure component 224 takes the set of symbol detections 808 and divides them into elements 1002 (e.g., N, H, O) and bonds 1004 (straight-bonds, hash-bonds, wedge-bonds). Structure component 224 includes direction estimation 1006 to then estimate the direction of bonds 1004 using principal component analysis. Also included is clustering connectivity analysis 1008, which clusters neighboring elements 1002 and bonds 1004 using a domain specific distance metric to generate a complete and connected molecular structure as output 226. This output can then be sent to or formatted for other programs to perform analysis, simulation, search, etc. For example, the generated structure can be exported and rendered in a chemical drawing program as shown at 1016 in FIG. 10B. A demonstration and evaluation of a prototype embodiment of this system is presented in Ouyang and Davis 2011.

Embodiments according to the present approach, e.g., 1008 in FIGS. 10A-B, use an agglomerative clustering procedure to generate the set of symbol connections. The procedure iteratively merges the two nearest symbols or symbol clusters, using the maximum distance between the entities in the two groups as the clustering metric (i.e., complete-link). Since as a general rule all symbols should be connected to at least one other symbol, the system reduces the distance value by a factor of two if there are only two symbols in the cluster. This encourages the procedure to connect isolated symbols first and effectively lowers the threshold for single connections. A penalty is imposed if the cluster makes connections that violate the rules of chemical valence (e.g., connecting three bonds to an "H", as Hydrogen should form only one bond).

The threshold at which to stop clustering can be set empirically (e.g., based on the bond-length estimate L). Alternatively one can train a separate classifier to predict whether or not two clusters should be joined using the distance metrics listed above as features (similar to the approach used in segment extraction).

FIG. 11 illustrates further details of an example apparatus and method (see FIG. 1A) for interpreting a human-drawn sketch in accordance with an embodiment of the invention. A user 10 may draw a sketch 12, e.g., a chemical structure 1102, into a user interface 1104 on a computing device 1106, such as a tablet PC or other touch screen device. The interface allows the user to use the same set of standard notations and symbols, e.g., chemical bonds, elements, and groups, which are familiar to the user and commonly used when drawing on paper. The computing device 1106 then processes the handwritten sketch to recognize candidate symbols and to produce an interpretation of the sketch. The interpretation of the sketch may be displayed 1108 to the user, e.g., on the screen of the tablet PC. Candidate symbols may be represented with machine-generated symbols based upon the interpretation of the human-drawn sketch. Alternatively or in addition, the interpretation of the sketch may be converted to a format that can be exported 1110 for other tasks, such as structure analysis, visualization, and database/literature search. For example, the generated structure can be exported and rendered in a chemical drawing program (e.g., CHEMDRAW), as shown at 1112. While a chemical structure is illustrated in FIG. 11, it should be understood that the human-drawn sketch 12 can be a chemical composition diagram, a biological composition diagram, an electrical schematic diagram, a mechanical diagram, or any other science- or engineering-based diagram for which human-drawn symbols have well-known counterparts.

FIG. 12 is a block diagram 1200 of an example apparatus for interpreting a human-drawn sketch in accordance with an embodiment of the invention. The apparatus includes a processor 1202 and may include a capture unit 1204 coupled to the processor to capture the sketch as the sketch is being drawn. The capture unit may, for example, include a mouse, a digital pen, a digitizer, a tablet PC, a touch pad, a touch screen, or spatial motion sensing system. The apparatus may also include a display unit 1206 coupled to the processor to display the interpretation of the human-drawn sketch. The display unit 1206 and the capture unit 1206 may be integrated, such as in a tablet PC as illustrated in FIG. 11.

In an embodiment, the processor 1202 is configured to determine a local metric indicating whether a candidate symbol belongs to a certain classification based on a set of features, the set of features including, as a feature, scores generated from feature images of the candidate symbol. The processor 1202 is further configured to determine a joint metric of multiple candidate symbols based on their respective classifications and interpret the sketch as a function of the local and joint metrics.

Figure 13:
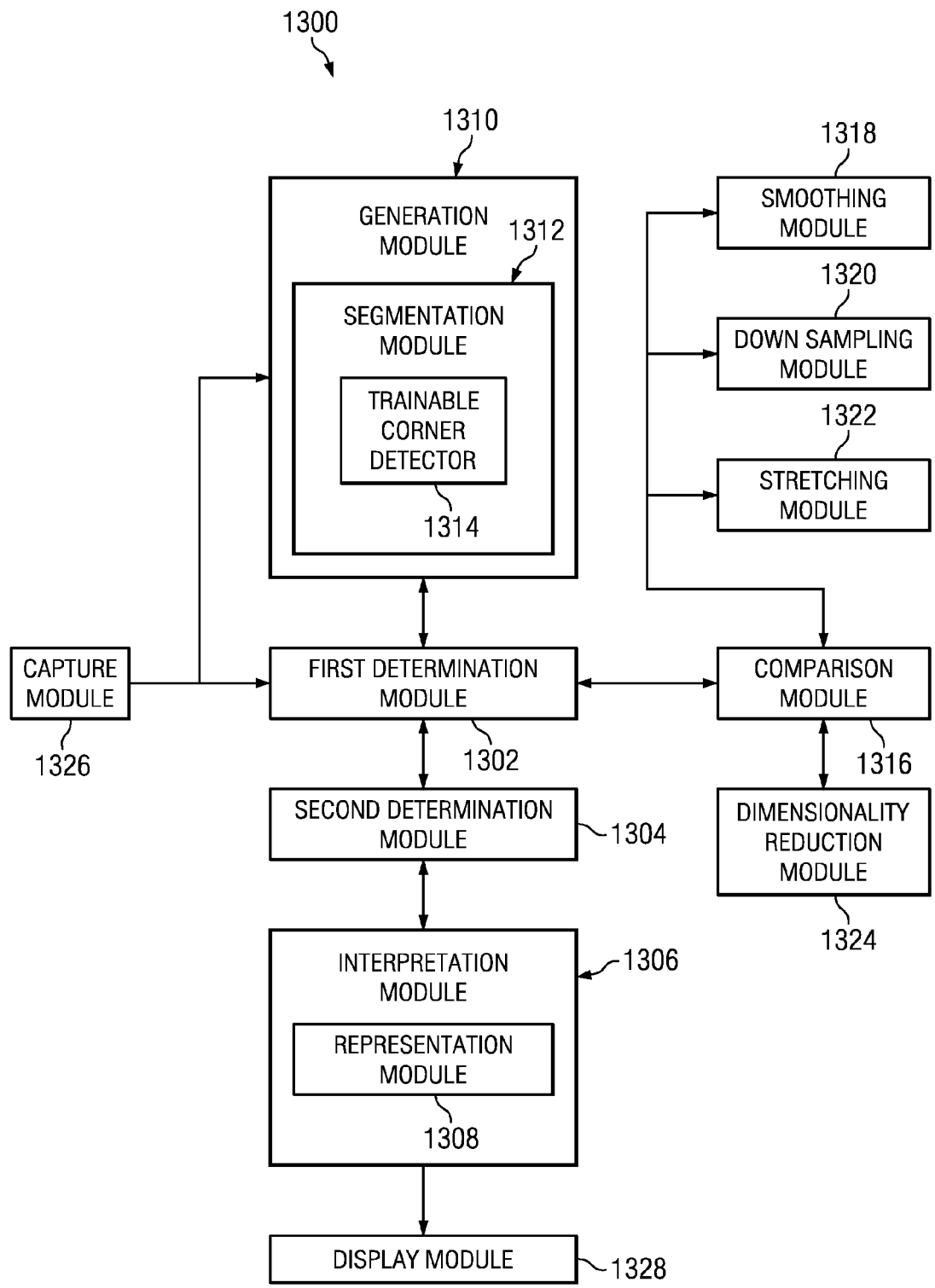
FIG. 13 is a block diagram of an example apparatus for interpreting a human-drawn sketch in accordance with an embodiment of the invention.

FIG. 13 is a block diagram 1300 of an example apparatus for interpreting a human-drawn sketch. The apparatus includes a first determination module 1302 configured to determine a local metric indicating whether a candidate symbol belongs to a certain classification based on a set of features, the set of features including, as a feature, scores generated from feature images of the candidate symbol. The apparatus further includes a second determination module 1304 coupled to the first determination module 1302 and configured to determine a joint metric of multiple candidate symbols based on their respective classifications. Further yet, the apparatus includes an interpretation module 1306 coupled to the first and second determination modules 1302 and 1304 and configured to interpret the sketch as a function of the local and joint metrics. The interpretation module can include a representation module 1308 configured to represent the candidate symbols with machine-generated symbols based upon the interpretation of the human-drawn sketch.

As described elsewhere herein, the human-drawn sketch can include a plurality of strokes. As shown in FIG. 13, the apparatus may further include a generation module 1310 coupled to at least the first determination module 1302 and configured to generate each candidate symbol based on one or more of the strokes. The generation module 1310 may include a segmentation module 1312 configured to divide the strokes in the human-drawn sketch into line segments at corner points. The segmentation module 1312 may include a trainable corner detector 1314 configured to detect the corner points and trained so that the line segments correspond to user-intended symbols.

The scores can include match scores, as described above, and the apparatus may further include a comparison module 1316 configured to compare the feature images against a set of stored templates to determine the match scores. The apparatus may include a smoothing module 1318 coupled to the comparison module 1316 and configured to smooth the feature images. The apparatus may include a downsampling module 1320 coupled to the comparison module 1316 and configured to down sample the feature images. Also included may be a stretching module 1322 coupled to the comparison module 1316 and configured to stretch the feature images. Further, the apparatus may include a dimensionality reduction module 1324 coupled to the comparison module and configured to reduce the dimensionality of the feature images.

In some embodiments, the apparatus includes a capture module 1326 coupled to at least the first determination module 1302 and configured to capture the sketch as the sketch is being drawn. In some embodiments, the apparatus further includes a display module 1328 coupled to the interpretation module and configured to display the interpretation of the human-drawn sketch.

Figure 14:
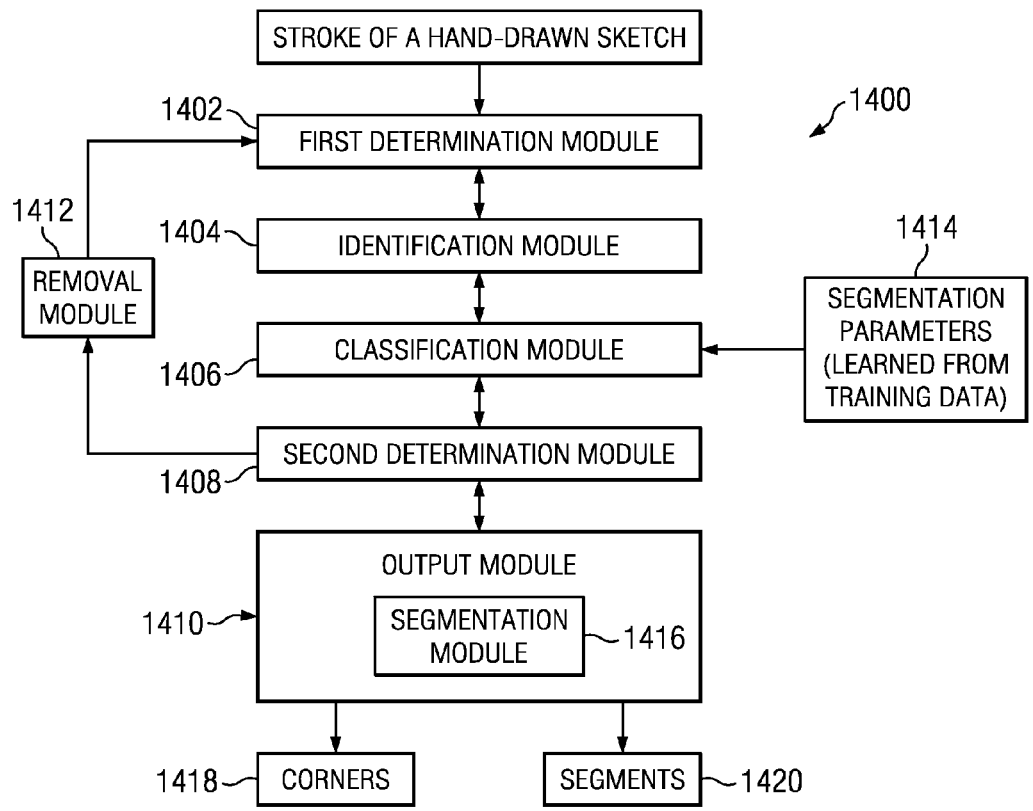
FIG. 14 is a block diagram of an example apparatus for detecting corners in a stroke of a hand-drawn sketch in accordance with an embodiment of the invention.

FIG. 14 is a block diagram 1400 of an example apparatus for detecting corners in a stroke of a hand-drawn sketch in accordance with an embodiment of the invention. The apparatus includes a first determination module 1402 configured to calculate, for each vertex in a set of vertices of a stroke, a likelihood metric that the vertex is a corner. The apparatus further includes an identification module 1404 and a classification module 1406. The identification module 1404 is coupled to the first determination module 1402 and configured to identify a least likely vertex based on its likelihood metric. The classification module 1406 is coupled to the identification module 1404 and configured to classify the least likely vertex using segmentation parameters learned from training data. Also included is a second determination module 1408 coupled to the classification module and configured to determine whether the least likely vertex is classified as a corner.

As illustrated in FIG. 14, the apparatus may further include an output module 1410 and a removal module 1412. The output module 1410 is coupled to the second determination module 1408 and configured to, if the least likely vertex is classified as a corner, return all vertices remaining in the set of vertices as corners 1418. The removal module 1412 is coupled to the second determination module 1408 and configured to, if the least likely vertex is not classified as a corner, remove the least likely vertex from the set of vertices and repeat the processing of the first determination module, the identification module, the classification module and the second determination module. The classification module 1406 may be configured to apply the segmentation parameters 1414 learned from the training data to a set of features. The output model may include a segmentation module 1416 configured to split the stroke at the corners into line segments 1420.

Figure 15:
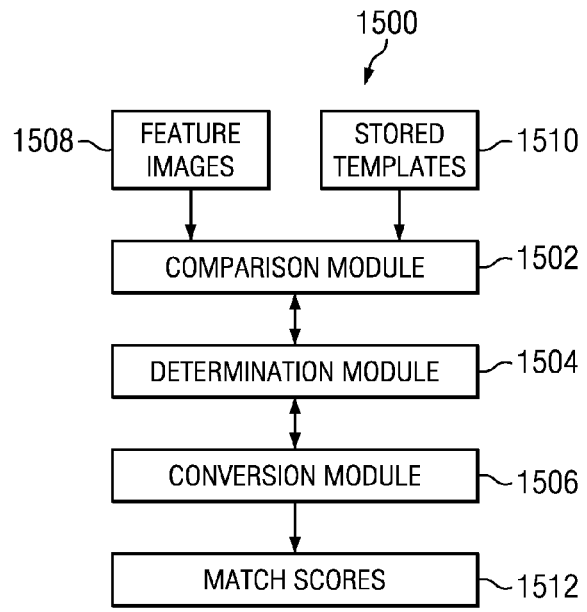
FIG. 15 is a block diagram of an example apparatus for generating match scores in accordance with an embodiment of the present invention.

FIG. 15 is a block diagram 1500 of an example apparatus for generating match scores in accordance with an embodiment of the present invention. The apparatus for generating match scores includes a comparison module 1502, a determination module 1504, and a conversion module 1506. The comparison module is configured to compare feature images 1508 of a candidate symbol against a set of stored templates 1510. The determination module 1504 is coupled to the comparison module 1502 and configured to determine match distances of the feature images to nearest template neighbors based on the comparison. The conversion module 1506 is coupled to the determination module 1504 and configured to convert the match distances into match scores 1512.

Embodiments of the present invention may be implemented in a variety of computer architectures. The tablet PC of FIG. 11 is for purposes of illustration and not a limitation of the example embodiments. The embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, some embodiments of the invention can take the form of a computer program product accessible from a non-transient computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Figure 16A:
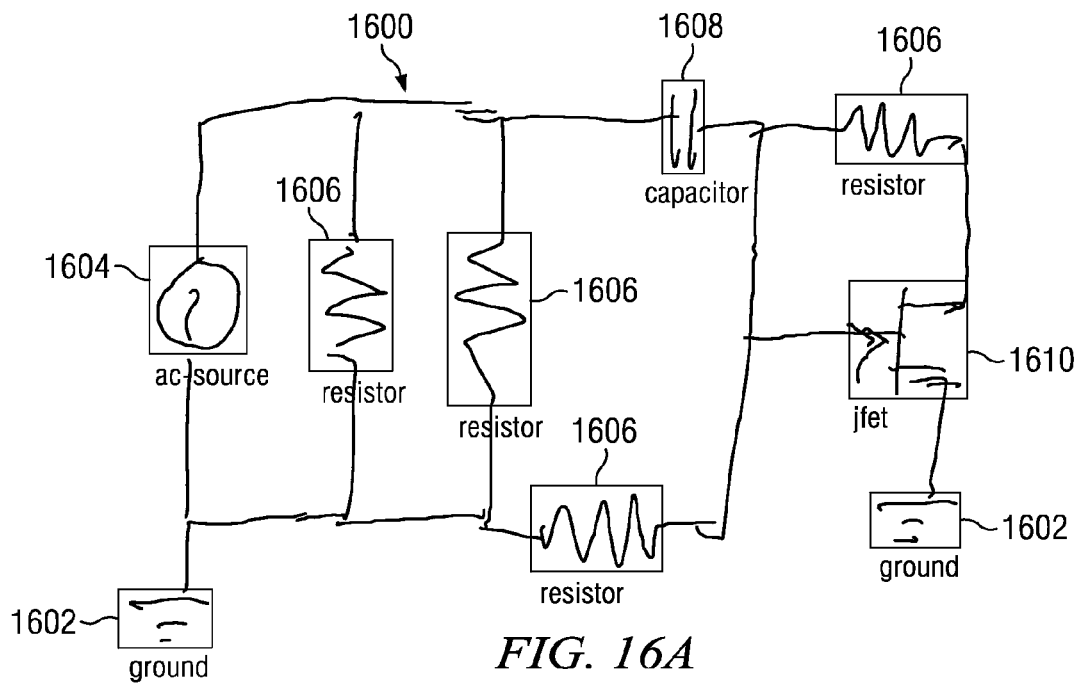
FIGS. 16A-B illustrates examples of hand-drawn electrical circuit diagrams recognized using an embodiment of the present approach.
Figure 16B:
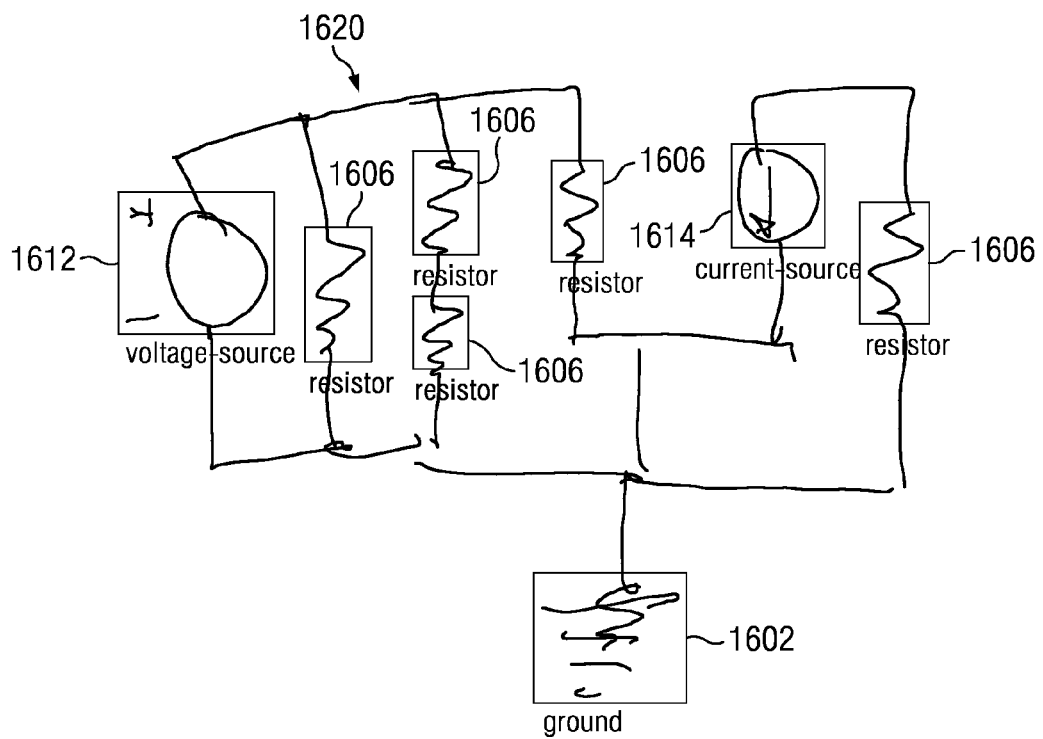

Other Embodiments:

While the above examples focus on chemical diagrams, embodiments of this approach have been used to interpret electrical circuit diagrams, such as those shown in FIGS. 16A and 16B. For example, an embodiment correctly recognized components of hand-drawn circuit sketch 1600 (FIG. 16A), such as grounds 1602, ac-source 1604, resistors 1606, capacitor 1608, and JFET 1610, including their interconnections. Similarly, correctly identified components in hand-drawn sketch 1620 (FIG. 16B) include resistors 1606, voltage source 1612, and current source 1614. Embodiments of the present approach can interpret hand-drawn electrical circuits (e.g., those shown in FIGS. 16A-B) which show significant drawing variations, such as overtracing and pen drag. Other sketching domains that may benefit from this approach include flow-charts, Unified Modeling Language (UML) diagrams, business process diagrams, etc.

An alternative architecture is to train an independent classifier at each level, then use some type of voting scheme to combine the predictions (see Ouyang and Davis NIPS 2009). That approach may provide faster training and inference, but by treating each layer in isolation it ignores any joint dependencies between features at different levels. Second, it requires the designer to specify a weighting scheme for each layer either manually or by some separate learning process.

Embodiments may also include information at other levels of detail in addition to segments and candidate symbols. This may improve accuracy in certain domains at the cost of computational complexity. One such embodiment, presented in Ouyang and Davis 2011, includes a third recognition level consisting of ink points sampled from the strokes in the sketch as part of the recognition process.

REFERENCES (Alvarado 2004) C. Alvarado and R. Davis. SketchREAD: A multi-domain sketch recognition engine. In UIST '04 Proc. of the 17th annual ACM symposium on User interface software and technology, 2004.

(Casey et. al. 1993) R. Casey, S. Boyer, P. Healey, A. Miller, B. Oudot, and K. Zilles. Optical recognition of chemical graphics. Document Analysis and Recognition, pages 627-631, 1993.

L. Gennari, L. Kara, T. Stahovich, and K. Shimada. Combining geometry and domain knowledge to interpret hand-drawn diagrams. Computers & Graphics, 29(4):547-562, 2005

(Gross 1996) M. Gross. The electronic cocktail napkin—a computational environment for working with design diagrams. Design Studies, 17(1):53-69, 1996.

(Hammond 2006) T. Hammond and R. Davis. Ladder: a language to describe drawing, display, and editing in sketch recognition. In International Conference on Computer Graphics and Interactive Techniques, 2006.

(Kara 2004) L. Kara and T. Stahovich. An image-based trainable symbol recognizer for sketch-based interfaces. AAAI Fall Symposium: Making Pen-Based Interaction Intelligent and Natural, 2004.

(Lafferty 2001) J. Lafferty, A. McCallum, and F. Pereira. Conditional random fields: Probabilistic models for segmenting and labeling sequence data. In Proc. ICML, pages 282-289, 2001.

J. LaViola Jr and R. Zeleznik. Mathpad 2: a system for the creation and exploration of mathematical sketches. ACM Transactions on Graphics, 23(3):432-440, 2004.

(Murphy 1999) K. Murphy, Y. Weiss, and M. Jordan. Loopy belief propagation for approximate inference: An empirical study. In Proc. of UAI, pages 467-475, 1999.

(Murphy 2003) K. Murphy, A. Torralba, and W. T. Freeman. Using the forest to see the trees: a graphical model relating features, objects and scenes. Advances in neural information processing systems, 16, 2003.

(Liu and Nocedal 1989) D. C. Liu and J. Nocedal. On the Limited Memory Method for Large Scale Optimization. Mathematical Programming 45(3): 503-528, 1989

(Oltmans 2007) M. Oltmans. Envisioning Sketch Recognition: A Local Feature Based Approach to Recognizing Informal Sketches. PhD thesis, Massachusetts Institute of Technology, Cambridge, Mass., 2007.

(Ouyang and Davis 2007) T. Ouyang and R. Davis. Recognition of hand drawn chemical diagrams. In Proc. AAAI, 2007.

(Ouyang and Davis 2009) T. Ouyang and R. Davis. A visual approach to sketched symbol recognition. In Proc. International Joint Conference on Artificial Intelligence (IJCAI), 2009.

(Ouyang and Davis NIPS 2009) T. Ouyang and R. Davis. Learning from neighboring strokes: Combining appearance and context for multi-domain sketch recognition. In Advances in Neural Information Processing (NIPS), pages 1401-1409, 2009.

(Ouyang and Davis 2011) T. Ouyang and R. Davis. ChemInk: A Natural Real-Time Recognition System for Chemical Drawings, In Proceedings of the International Conference on Intelligent User Interfaces (IUI), 2011

B. Paulson and T. Hammond. Paleosketch: accurate primitive sketch recognition and beautification. In Proc. IUI, pages 1-10, 2008.

T. Sezgin and R. Davis. Sketch based interfaces: Early processing for sketch understanding. In International Conference on Computer Graphics and Interactive Techniques, 2006.

(Sezgin 2008) T. Sezgin and R. Davis. Sketch recognition in interspersed drawings using time-based graphical models. Computers & Graphics, 32(5):500-510, 2008.

F. Sha and F. Pereira. Shallow parsing with conditional random fields. In Proc. ACL, pages 134-141, 2003.

M. Shilman, H. Pasula, S. Russell, and R. Newton. Statistical visual language models for ink parsing. AAAI Spring Symposium on Sketch Understanding, 2002.

(Shilman et al. 2004) M. Shilman, P. Viola, and K. Chellapilla. Recognition and grouping of handwritten text in diagrams and equations. In Frontiers in Handwriting Recognition, 2004.

(Szummer 2005) M. Szummer. Learning diagram parts with hidden random fields. In International Conference on Document Analysis and Recognition, pages 1188-1193, 2005.

(Tenneson 2008) D. Tenneson. Interpretation of Molecule Conformations from Drawn Diagrams. PhD thesis, Brown University, 2008.

Y. Xiong and J. LaViola Jr. Revisiting shortstraw: improving corner finding in sketch-based interfaces. In Proc. Eurographics Symposium on Sketch-Based Interfaces and Modeling, pages 101-108, 2009.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of detecting corners in a stroke of a hand-drawn sketch, the method comprising:
by a processor,
for each vertex in a set of vertices of a stroke, calculating a likelihood metric that the vertex is a corner;
identifying a least likely vertex based on its likelihood metric;
classifying the least likely vertex using segmentation parameters learned from training data;
determining whether the least likely vertex is classified as a corner;
if the least likely vertex is classified as a corner, the method further comprises returning all vertices remaining in the set of vertices as corners; and
if the least likely vertex is not classified as a corner, the method further comprises removing the least likely vertex from the set of vertices and repeating the calculating, identifying, classifying, and determining.

2. The method according to claim 1, wherein the likelihood metric includes a measure of a cost of removing the vertex from the set of vertices.

3. The method according to claim 1, wherein classifying the least likely vertex comprises applying the segmentation parameters learned from the training data to a set of features.

4. The method according to claim 3, wherein the set of features includes, as a feature, the likelihood metric.

5. The method according to claim 3, wherein the set of features includes any of a measure of a diagonal length, a measure of ink density, a measure of the distance to the farther of two neighboring vertices, a measure of the nearer of the two neighboring vertices, and a measure of the sum of the distances to the two neighboring vertices.

6. The method according to claim 1, further comprising splitting the stroke at the corners into line segments.

7. An apparatus for detecting corners in a stroke of a hand-drawn sketch, the apparatus comprising, in a processor:
a first determination module configured to calculate, for each vertex in a set of vertices of a stroke, a likelihood metric that the vertex is a corner;
an identification module coupled to the first determination module and configured to identify a least likely vertex based on its likelihood metric;
a classification module coupled to the identification module and configured to classify the least likely vertex using segmentation parameters learned from training data;
a second determination module coupled to the classification module and configured to determine whether the least likely vertex is classified as a corner;
an output module coupled to the second determination module and configured to, if the least likely vertex is classified as a corner, return all vertices remaining in the set of vertices as corners; and
a removal module coupled to the second determination module and configured to, if the least likely vertex is not classified as a corner, remove the least likely vertex from the set of vertices and repeat the processing of the first determination module, the identification module, the classification module and the second determination module.

8. The apparatus according to claim 7, wherein the classification module is further configured to apply the segmentation parameters learned from the training data to a set of features.

9. The apparatus according to claim 7, wherein the output model includes a segmentation module configured to split the stroke at the corners into line segments.

10. A method of generating match scores comprising:
by a processor,
comparing feature images of a candidate symbol against a set of stored templates;
determining match distances of the feature images to nearest template neighbors based on the comparison; and
converting the match distances into match scores.

11. The method according to claim 10, wherein the stored templates are derived from training data.

12. The method according to claim 11, wherein the stored templates include feature images of symbols identified in the training data.

13. The method according to claim 10, wherein the match distances are Euclidian distances.

14. The method according to claim 10, wherein the set of stored templates comprises classes of templates.

15. The method according to claim 14, wherein determining match distances comprises determining a match distance to a nearest template neighbor in each class of templates.

16. The method according to claim 10, wherein determining match distances comprises using principal component analysis to calculate principal components of the feature images, and wherein the match distances are determined based on the principal components of the feature images.

17. An apparatus for generating match scores comprising, in a processor:
a comparison module configured to compare feature images of a candidate symbol against a set of stored templates;
a determination module coupled to the comparison module and configured to determine match distances of the feature images to nearest template neighbors based on the comparison; and
a conversion module coupled to the determination module and configured to convert the match distances into match scores.

18. The apparatus according to claim 17, wherein the stored templates are derived from training data.

19. The apparatus according to claim 17, wherein the stored templates include feature images of symbols identified in the training data.

20. The apparatus according to claim 17, wherein the match distances are Euclidian distances.

21. The apparatus according to claim 17, wherein the set of stored templates comprises classes of templates.

22. The apparatus according to claim 21, wherein the determination module is further configured to determine a match distance to a nearest template neighbor in each class of templates.

23. The apparatus according to claim 17, wherein the determination module is further configured to use principal component analysis to calculate principal components of the feature images, and wherein the match distances are determined based on the principal components of the feature images.

24. A method of detecting corners in a stroke of a human-drawn sketch, the method comprising:
- capturing a representation of a stroke of a human-drawn sketch being drawn by a user via an input mechanism into a user-interface, the captured stroke being represented by a set of vertices, the user interface allowing the user to use a set of notations and symbols that are commonly used when drawing on paper;
- for each vertex in the set of vertices of the stroke, calculating a likelihood metric that the vertex is a corner;
- identifying a least likely vertex based on its likelihood metric;
- classifying the least likely vertex using segmentation parameters learned from training data;
- determining whether the least likely vertex is classified as a corner;
- if the least likely vertex is classified as a corner, the method further comprises returning all vertices remaining in the set of vertices as detected corners; and
- if the least likely vertex is not classified as a corner, the method further comprises removing the least likely vertex from the set of vertices and repeating the calculating, identifying, classifying, and determining.

25. The method according to claim 24, wherein capturing the representation of the stroke of the human-drawn sketch includes capturing and recording spatial and temporal occurrences of the stroke as the sketch is being drawn.

26. The method according to claim 24, further comprising causing the user interface to display to the user an interpretation of the human-drawn sketch based on the detected corners.

27. The method according to claim 26, wherein the input mechanism is integrated with a display that displays the user interface.

28. An apparatus for detecting corners in a stroke of a human-drawn sketch, the apparatus comprising:
- an input mechanism that effectuates capturing of a representation of a stroke of a human-drawn sketch being drawn by a user into a user-interface, the captured stroke represented by a set of vertices, the user interface allowing the user to use a set of notations and symbols that are commonly used when drawing on paper; and
- a processor coupled to the input mechanism, the processor configured to:
  - for each vertex in the set of vertices of the stroke, calculate a likelihood metric that the vertex is a corner;
  - identify a least likely vertex based on its likelihood metric;
  - classify the least likely vertex using segmentation parameters learned from training data;
  - determine whether the least likely vertex is classified as a corner;
  - if the least likely vertex is classified as a corner, the method further comprises returning all vertices remaining in the set of vertices as detected corners; and
  - if the least likely vertex is not classified as a corner, the method further comprises removing the least likely vertex from the set of vertices and repeating the calculating, identifying, classifying, and determining.

29. The apparatus according to claim 28, wherein the input mechanism effectuates capturing and recording of spatial and temporal occurrences of the stroke as the sketch is being drawn.

30. The apparatus according to claim 28, wherein the processor is further configured to cause the user interface to display to the user an interpretation of the human-drawn sketch based on the detected corners.

31. The apparatus according to claim 30, further comprising a display integrated with the input mechanism and coupled to the processor, the display displaying the user interface.

* * * * *